(12) United States Patent
Neet et al.

(10) Patent No.: US 9,070,518 B2
(45) Date of Patent: Jun. 30, 2015

(54) STARTER SYSTEM

(71) Applicant: REMY TECHNOLOGIES, LLC, Pendleton, IN (US)

(72) Inventors: Kirk Neet, Pendleton, IN (US); David Fulton, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 7 days.

(21) Appl. No.: 13/678,486

(22) Filed: Nov. 15, 2012

(65) Prior Publication Data

US 2013/0135065 A1    May 30, 2013

Related U.S. Application Data

(60) Provisional application No. 61/560,119, filed on Nov. 15, 2011.

(51) Int. Cl.
*H01H 3/28* (2006.01)
*F02N 11/08* (2006.01)
*F02N 15/06* (2006.01)
*F02N 15/02* (2006.01)

(52) U.S. Cl.
CPC ............ *H01H 3/28* (2013.01); *F02N 11/0814* (2013.01); *F02N 11/0844* (2013.01); *F02N 11/0851* (2013.01); *F02N 11/087* (2013.01); *F02N 15/023* (2013.01); *F02N 15/067* (2013.01); *F02N 2011/0892* (2013.01); *F02N 2200/022* (2013.01); *F02N 2200/048* (2013.01); *F02N 2300/106* (2013.01); *Y02T 10/48* (2013.01); *F02N 11/0859* (2013.01)

(58) Field of Classification Search
CPC ................................... F02N 11/0851

USPC ..................... 335/126; 123/179.3
See application file for complete search history.

(56) References Cited

U.S. PATENT DOCUMENTS

| 4,586,467 | A | 5/1986 | Raver |
| 5,345,901 | A | 9/1994 | Siegenthaler et al. |
| 7,948,338 | B2 * | 5/2011 | Niimi et al. ................... 335/126 |
| 7,973,623 | B2 * | 7/2011 | Andoh ........................... 335/126 |

(Continued)

FOREIGN PATENT DOCUMENTS

JP    2002227750 A    8/2002

OTHER PUBLICATIONS

KIPO Search Report and Written Opinion dated Mar. 28, 2013 for corresponding Application No. PCT/US2012/065370.

*Primary Examiner* — Mohamad Musleh
(74) *Attorney, Agent, or Firm* — Greenberg Traurig, LLP

(57) ABSTRACT

Some embodiments of the invention provide a starter system including a starter, capable of being in communication with an electronic control unit. The starter can include a motor coupled to a circuit and a pinion including a plunger, and a plurality of solenoid assemblies including a plurality of biasing members. The plurality of solenoid assemblies can include at least one solenoid winding capable of moving the plunger, and at least one solenoid assembly capable of holding the plunger, and at least one solenoid assembly capable of controlling current flow to the motor. Some embodiments include a first switch coupled to the circuit that is capable of being activated by the plunger to control current flowing to at least a portion of the circuit. Some embodiments include at least two power isolation switches capable of controlling a current flow within the circuit.

20 Claims, 17 Drawing Sheets

(56) References Cited

U.S. PATENT DOCUMENTS

| | | | |
|---|---|---|---|
| 8,531,258 B2* | 9/2013 | Niimi et al. | 335/126 |
| 2002/0053961 A1* | 5/2002 | Kajino | 335/126 |
| 2002/0140291 A1 | 10/2002 | Osada et al. | |
| 2010/0059007 A1* | 3/2010 | Senda et al. | 123/179.4 |
| 2010/0251852 A1* | 10/2010 | Murata et al. | 74/7 A |
| 2010/0264670 A1* | 10/2010 | Usami et al. | 290/38 R |
| 2010/0282200 A1* | 11/2010 | Notani et al. | 123/179.3 |
| 2011/0095852 A1* | 4/2011 | Niimi et al. | 335/184 |
| 2011/0140813 A1* | 6/2011 | Suzuki et al. | 335/156 |
| 2011/0187127 A1* | 8/2011 | Murata et al. | 290/38 C |
| 2012/0162847 A1* | 6/2012 | Suzuki et al. | 361/206 |
| 2013/0141192 A1* | 6/2013 | Neet et al. | 335/126 |

\* cited by examiner

STARTER SYSTEM

BACKGROUND

Some electric machines can play important roles in vehicle operation. For example, some vehicles can include a starter, which can, upon a user closing an ignition switch, lead to cranking of engine components of the vehicle. Drive train systems capable of frequent start and stop conditions are a further requirement in modern vehicles. Frequent start-stop conditions require the starter to operate at high efficiency both at cold engine crank and warm engine crank environments. The demands of frequent start-stop conditions require various components and systems that function more rapidly and more efficiently to increase reliability, reduce energy consumption and enhance the driving experience. Some starters can include a one or more sensor assemblies for detection of various functional components of the start motor, and a control system capable of directing various functional components of the starter system to enable reliable, synchronous engagement. Some starter motors can include a field assembly that can produce a magnetic field to rotate some starter motor components. Some starter motors can include one or more field assemblies that can produce a magnetic field to translate some starter motor components.

SUMMARY

Some embodiments of the invention provide a starter that can perform well at high-speeds having low torque demand while also operating well at low speeds having high torque demanded of the starter. In some embodiments, the starter is able to meet the cold crank requirement and function under a warm start scenario while reducing the pinion speed at low pinion torque. In conjunction with this operating parameter, some embodiments of the invention provide components and systems that are configured and arranged to function to allow better engagement of the starter system with the drivetrain of the vehicle.

Some embodiments of the invention provide a starter system comprising a starter capable of being controlled by an electronic control unit. In some embodiments, the starter can include a motor coupled to a circuit, a plurality of solenoid assemblies, and a plunger movably coupled to a pinion.

In some embodiments, the motor and the plurality of solenoid assemblies is configured and arranged to be capable of being controlled by an electronic control unit. In some embodiments, the plunger is configured and arranged to be electromagnetically coupled to at least one solenoid assembly.

Some embodiments of the circuit include a first switch capable of actuation by the plunger. In some embodiments, the first switch comprises at least two contacts capable of electrical coupling with the motor, and is configured and arranged to actuate under the influence of the plunger to either cause current to flow, or to prevent current flow. In some embodiments, the at least two contacts can couple with a coupling member that is integral to the first switch.

In some other embodiments, the coupling member comprises the plunger. In some embodiments, the movement of the plunger and coupling with the at least two contacts enables the flow of current through the first switch and movement of the plunger and decoupling from at least one of the at least two contacts prevents the flow of current through the first switch.

In some embodiments, a solenoid assembly can include a plunger-return biasing member and at least two solenoid windings at least partially circumscribing the plunger. In some embodiments, the solenoid windings are configured and arranged to alternately move and to prevent motion of the plunger, and in some embodiments, the resistance of the second set of solenoid windings is greater than the resistance of the first set of solenoid windings.

Some embodiments provide a secondary solenoid assembly comprising a third solenoid winding at least partially circumscribing a secondary plunger, and is configured and arranged to electrically couple with a set of secondary solenoid assembly contacts. In some embodiments, the third solenoid winding can be configured and arranged to move the secondary plunger to couple and decouple with the set of secondary solenoid assembly contacts to control current to flow to the motor.

Some embodiments of the circuit include at least one pin coupled to the circuit capable of enabling a current flow to at least one other component in the circuit under control from an electronic control unit. In some embodiments, one or more pins can enable the flow of current to one or more solenoid windings independently.

In other embodiments, the circuit can include at least two power isolation switches. In some embodiments, one or more of the power isolation switches can be controlled by an electronic control unit. Some embodiments include a first and a second power isolation switch capable of being electrically coupled to at least the first solenoid assembly and at least the second solenoid assembly, each configured and arranged to be capable of controlling current flow to the first and the second solenoid assembly. In some embodiments, the power isolation switches can comprise a magnetic switch. In other embodiments, the power isolation switch can comprise a MOSFET, transistor or any other type of switch.

Some embodiments of the invention provide a starter system comprising a starter capable of being controlled by an electronic control unit. In some embodiments, the starter can include a motor coupled to a circuit, a plurality of solenoid assemblies, and a plunger movably coupled to a pinion. In some embodiments, the motor and the plurality of solenoid assemblies is configured and arranged to be capable of being controlled by an electronic control unit. In some embodiments, the plunger is configured and arranged to be electromagnetically coupled to at least one solenoid assembly including at least two solenoid windings being configured and arranged to alternately move and to prevent motion of the plunger. The circuit can include at least two power isolation switches capable of being controlled by an electronic control unit. In some embodiments, the at least two power isolation switches can comprise a magnetic switch. In some embodiments, at least one power isolation switch can control the flow of current to move the plunger and at least one power isolation switch can control the flow of current to the motor.

DETAILED DESCRIPTION

Figure 1:
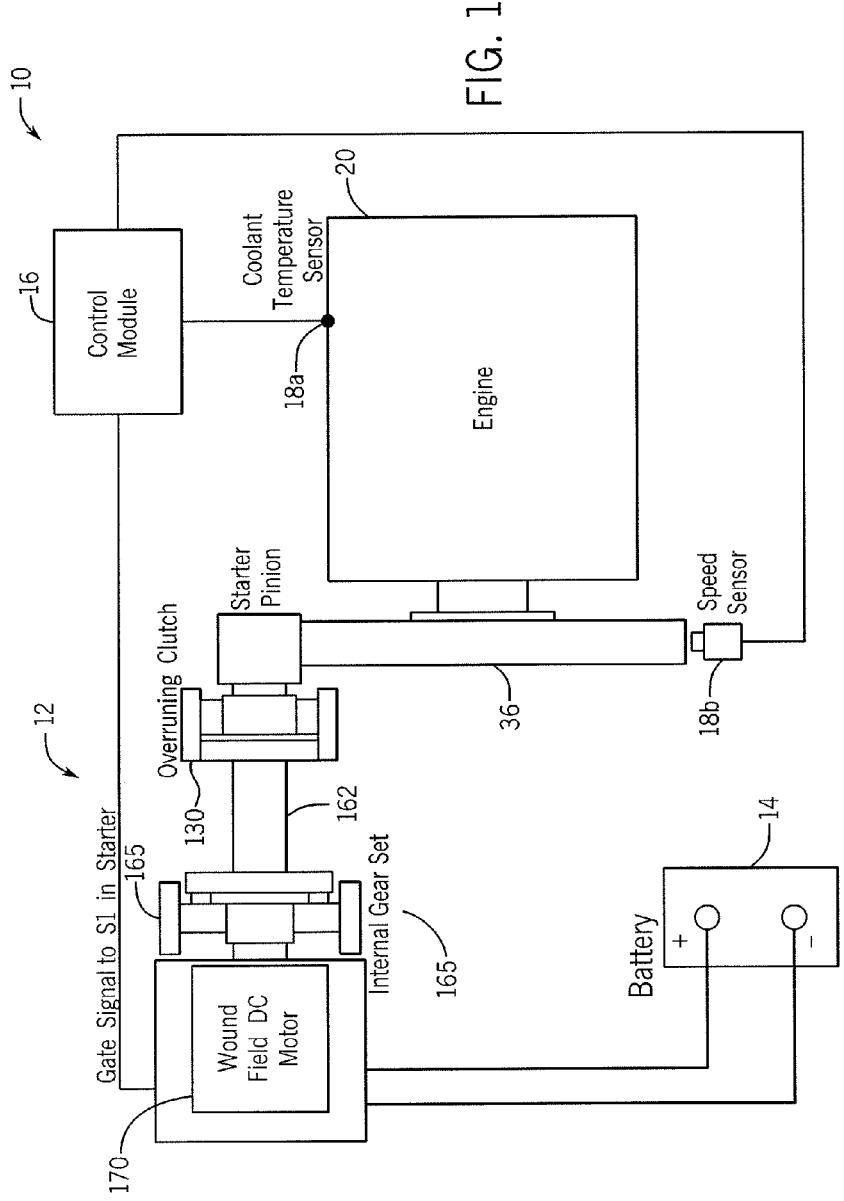
FIG. 1 is a diagram of a machine control system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Figure 6A:
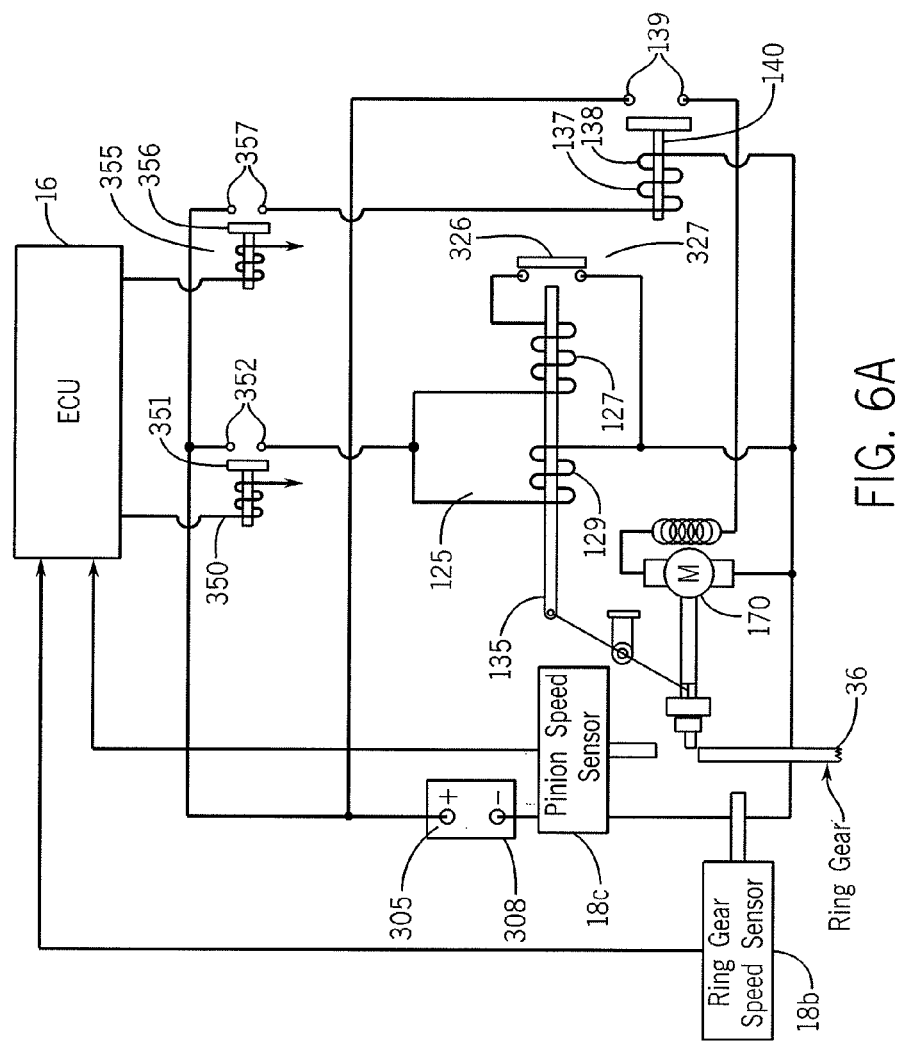
FIGS. 6A-6C are circuit diagrams representing portions of starter control system according to some embodiments of the invention.
Figure 6B:
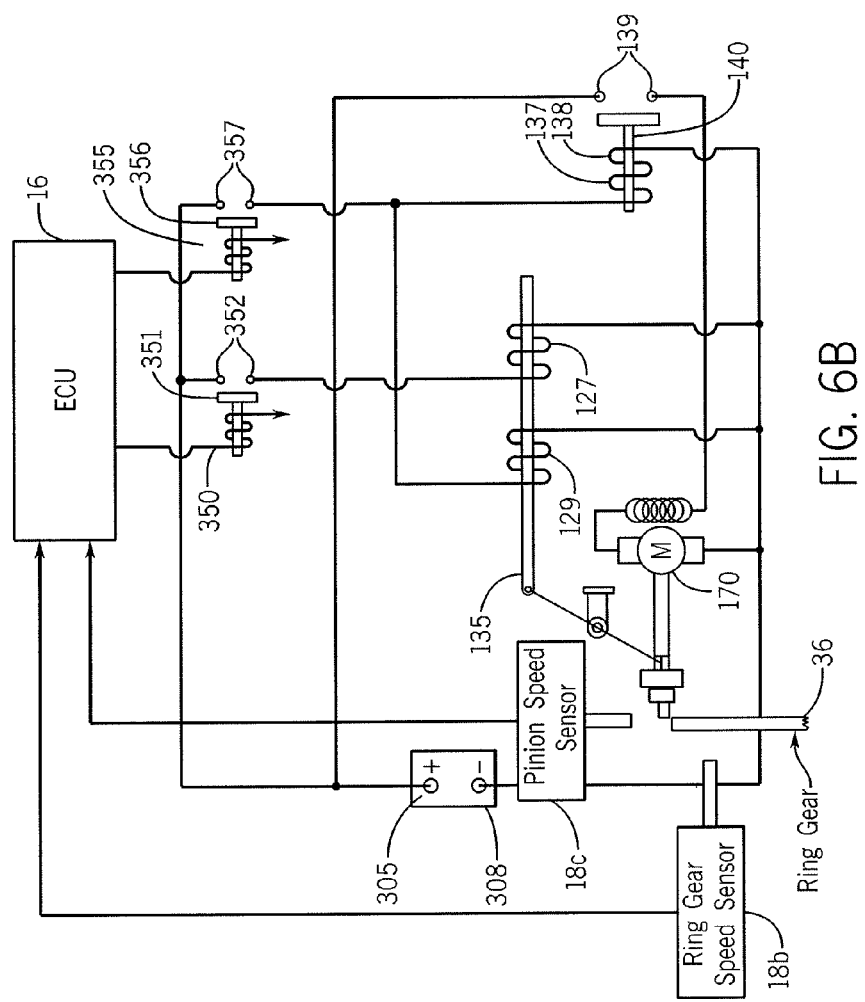
Figure 6C:
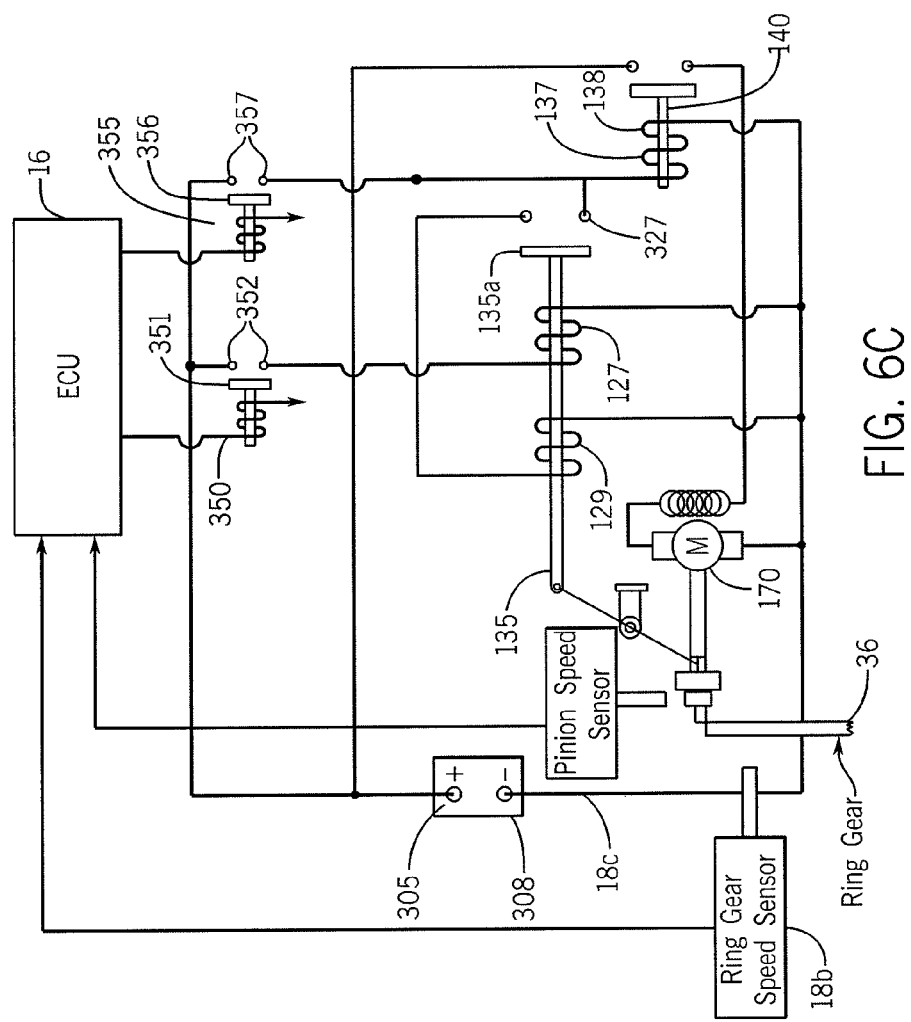

FIG. 1 illustrates a starter control system 10 according to one embodiment of the invention. The system can include an electric machine, a power source 14, such as a battery, a control module 16, one or more sensors 18a,18b, (and 18c as shown in FIGS. 6a, 6b, 6c) and an engine 20, such as an internal combustion engine. In some embodiments, a vehicle, such as an automobile, can comprise the system, although other vehicles can include the system. In some embodiments, non-mobile apparatuses, such as stationary engines, can comprise the system. Moreover, in some embodiments, the control module 16 can comprise an electronic control unit, an electronic control module 16, or any other apparatus configured and arranged to receive and output signals in response to one or more input signals (e.g., signals originating from the sensors).

In addition to the conventional engine 20 starting episode (i.e., a "cold start" starting episode), the starter control system 10 can be used in other starting episodes. In some embodiments, the control system 10 can be configured and arranged to enable a "stop-start" starting episode. For example, the control system 10 can start an engine 20 when the engine 20 has already been started (e.g., during a "cold start" starting episode) and the vehicle continues to be in an active state (e.g., operational), but the engine 20 is automatically temporarily inactivated (e.g., the engine 20 has substantially or completely ceased moving at a stop light).

Moreover, in some embodiments, in addition to, or in lieu of being configured and arranged to enable a stop-start starting episode, the control system 10 can be configured and arranged to enable a "change of mind stop-start" starting episode. The control system 10 can start an engine 20 when the engine 20 has already been started by a cold start starting episode and the vehicle continues to be in an active state and the engine 20 has been automatically deactivated, but continues to move (i.e., the engine 20 is coasting). For example, after the engine 20 receives a deactivation signal, but before the engine 20 substantially or completely ceases moving, the user can decide to reactivate the engine 20 (i.e. vehicle operator removes his foot from the brake pedal) so that the pinion 150 engages the ring gear 36 as the ring gear 36 is coasting. After engaging the pinion 150 with the ring gear 36, the motor 170 can restart the engine 20 with the pinion 150 already engaged with the ring gear 36. In some embodiments, the control system 10 can be configured for other starting episodes, such as a conventional "soft start" starting episodes (e.g., the motor 170 is at least partially activated during engagement of the pinion 150 and the ring gear 36).

The following discussion is intended as an illustrative example of some of the previously mentioned embodiments employed in a vehicle, such as an automobile, during a starting episode. However, as previously mentioned, the control system 10 can be employed in other structures for engine 20 starting.

As previously mentioned, in some embodiments, the control system 10 can be configured and arranged to start the engine 20 during a change of mind stop-start starting episode. For example, after a user cold starts the engine 20, the engine 20 can be deactivated upon receipt of a signal from the engine control unit 16 (e.g., the vehicle is not moving and the engine speed is at or below idle speed, the engine control unit 16 instructs the engine 20 to inactivate after the vehicle user depresses a brake pedal for a certain duration, etc.), the engine 20 can be deactivated, but the vehicle can remain active (e.g., at least a portion of the vehicle systems can be operated by the power source 14 or in other manners). At some point after the engine 20 is deactivated, but before the engine 20 ceases moving, the vehicle user can choose to restart the engine 20 by signaling the engine control unit 16 (e.g., via releasing the brake pedal, depressing the acceleration pedal, etc.) which will cause the pinion 150 to be automatically engaged with the ring gear 36. For example, in order to reduce the potential risk of damage to the pinion 150, and/or the ring gear 36, a speed of the pinion 150 (the pinion speed multiplied by the ring/pinion gear ratio) can be substantially synchronized with a speed of the ring gear 36 (i.e., a speed of the engine 20) when the starter 12 attempts to engage the pinion 150 with the ring gear 36. The engine control unit 16 can then use at least some portions of the starter control system 10 to restart the engine 20.

Figure 2:
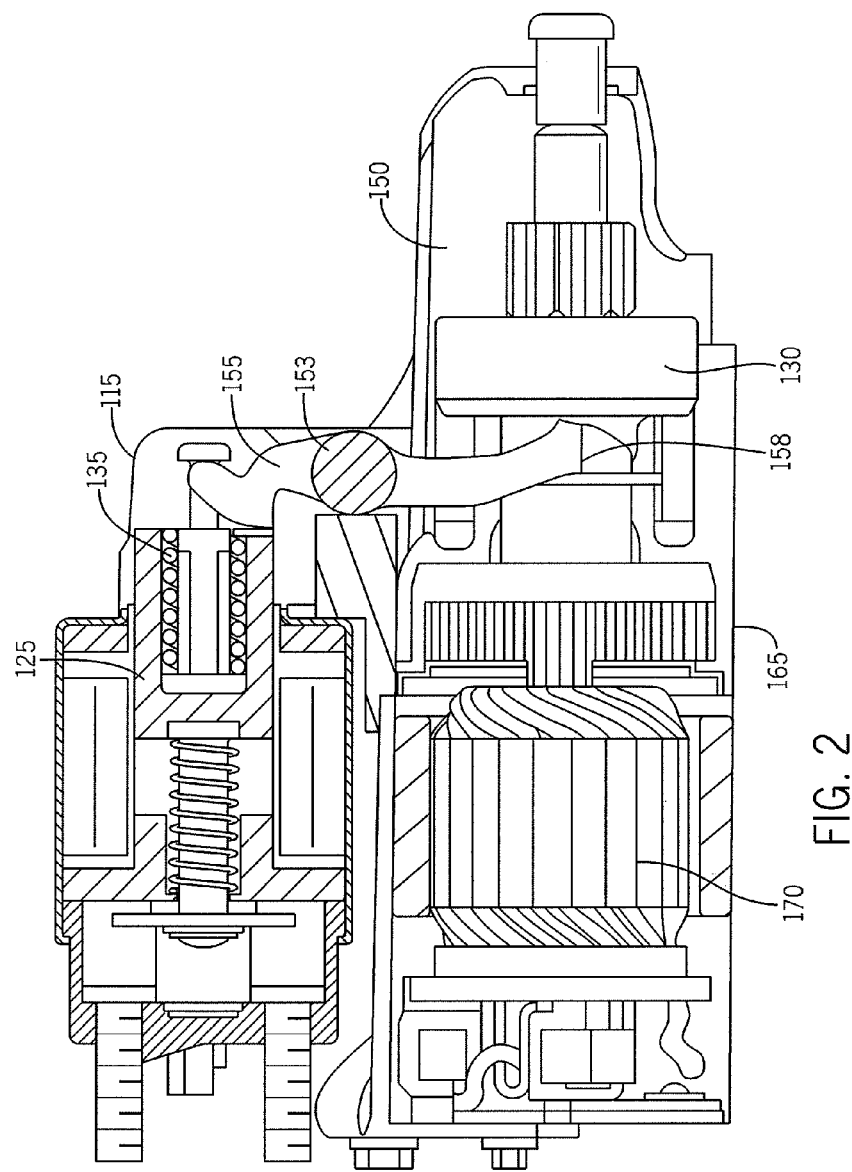
FIG. 2 is cross-sectional view of a conventional starter.

As shown in FIG. 2, in some embodiments, the electric machine can comprise a starter 12. In some embodiments, the starter 12 can comprise a housing 115, a gear train 165, a brushed or brushless motor 170, a solenoid assembly 125, a clutch, such as an overrunning clutch 130, and a pinion 150. In some embodiments, the starter 12 can operate in a generally conventional manner. For example, in response to a signal (e.g., a user closing a switch, such as an ignition switch 315), circulation of a current through the solenoid assembly 125 can cause a plunger 135 to move the pinion 150 into an engagement position (e.g., an abutment position and/or an engaged position) with a ring gear 36 of a crankshaft of the engine 20. Further, the same or another signal can lead to the motor generating an electromotive force, which can be translated through the gear train 165 to the pinion 150 engaged with the ring gear 36. As a result, in some embodiments, the pinion 150 can rotate components in the engine 20, which can lead to engine 20 ignition. Further, in some embodiments, the overrunning clutch 130 can reduce a risk of damage to the starter 12 and the motor 170 by disengaging the pinion 150 from a shaft connecting the pinion 150 and the motor 170 (e.g., allowing the pinion 150 to free spin if it is still engaged with the ring gear 36). In some embodiments, the pinion 150 can be directly coupled to a shaft 162 of the motor 170 and can function without a gear train 165 (e.g., a substantially direct-drive configuration).

In some embodiments, the solenoid assembly 125 can comprise one or more sets of solenoid windings. For example, the solenoid assembly 125 can comprise a first set solenoid windings 127 and a second set of solenoid windings 129. Moreover, in some embodiments, the starter 12 (e.g., the solenoid assembly 125) can include a plunger 135 coupled to a shift lever 153, including a first end 155 and a second end 158. The shift lever 153 can be coupled to the pinion 150. As a result, in some embodiments, by activating one or more of the solenoid windings 127,129, the plunger 135 can be moved (e.g., drawn inward or pushed outward) by at least a portion of the magnetomotive force generated by the windings 127,129 and at least a portion of the movement created can be used to engage the pinion 150 and the ring gear 36.

In some embodiments, the first and second sets of solenoid windings 127,129 can comprise different functions. In some embodiments, the first set of solenoid windings 127 can be configured and arranged to move the plunger 135. For example, after the user closes the circuit (e.g., via closing the ignition switch 315), current can flow through the first set of solenoid windings 127 to at least partially energize the first set of windings. As a result, the plunger 135 can move (e.g., be drawn inward through the first set of solenoid windings 127), which can cause the shift lever 153 to move the pinion 150 into engagement with the ring gear 36. In some embodiments, the second set of solenoid windings 129 can function to at least partially retain the plunger 135 in a desired position. For example, upon energization, the first set of solenoid windings 127 can function to move the plunger 135 from a first position (e.g., where the plunger 135 is biased via a spring force when little to no current flows through the first or second set of solenoid windings 129) to a second position (e.g., where the plunger 135 moves the shift lever 153 to cause the pinion 150 to engage the ring gear 36). Moreover, in some embodiments, the second set of solenoid windings 129 can also function to move the plunger 135 from the first position to the second position, in lieu of, or in addition to, the first set of solenoid windings 127. In some embodiments, the first set of solenoid windings 127 can be substantially or completely de-energized and the second set of solenoid windings 129 can be energized or remain energized to retain the plunger 135 in the second position. The second set of windings 129 can comprise a greater resistance and, as a result, a lesser current relative to the first set of solenoid windings 127. In some embodiments, after the engine 20 has been started, the second set of solenoid windings 129 can be substantially or completely de-energized and a spring force (not shown) can move the plunger 135 back to the first position.

Figure 3A:
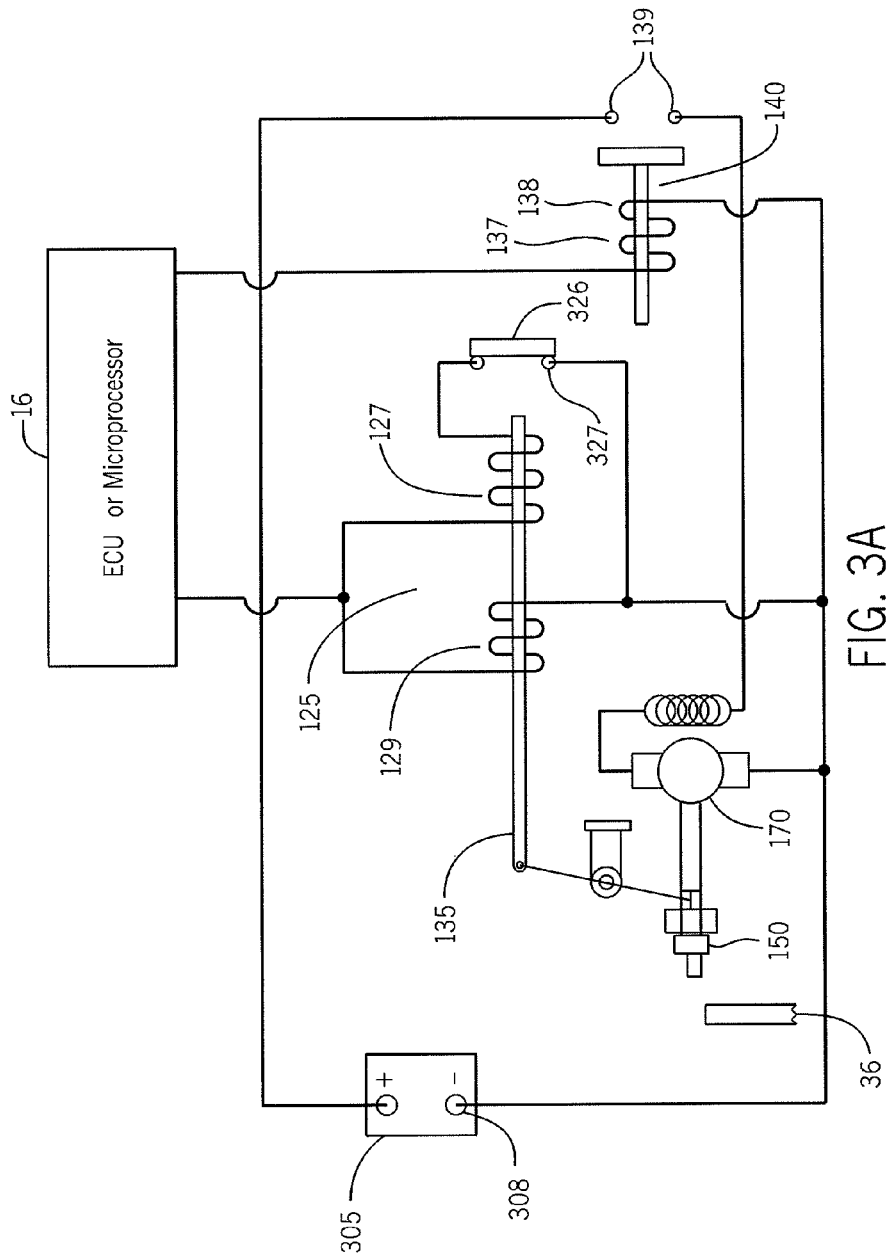
FIG. 3A is circuit diagram representing portions of a starter control system according to one embodiment of the invention.
Figure 3B:
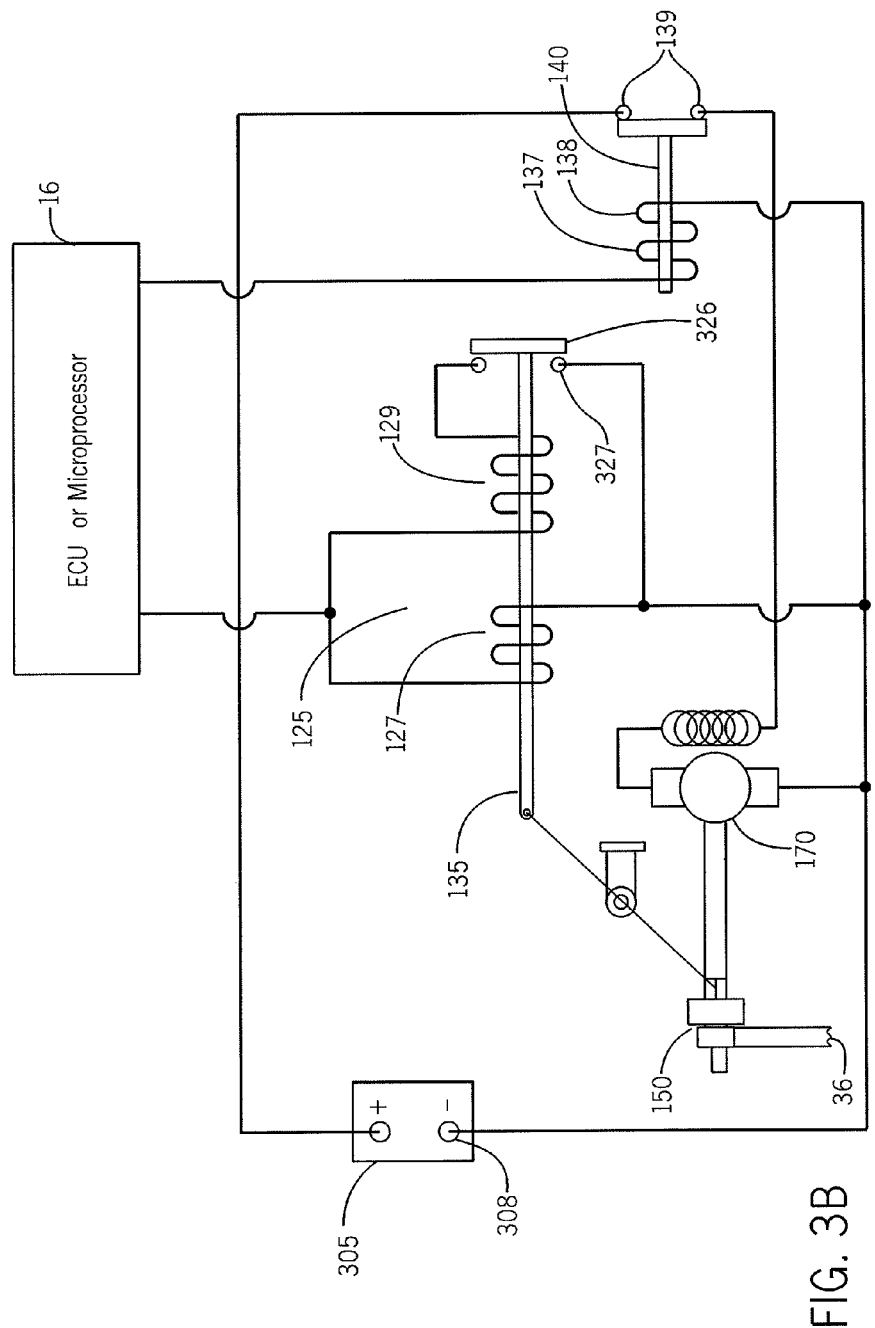
FIG. 3B is circuit diagram representing portions of a starter control system according to one embodiment of the invention.
Figure 3C:
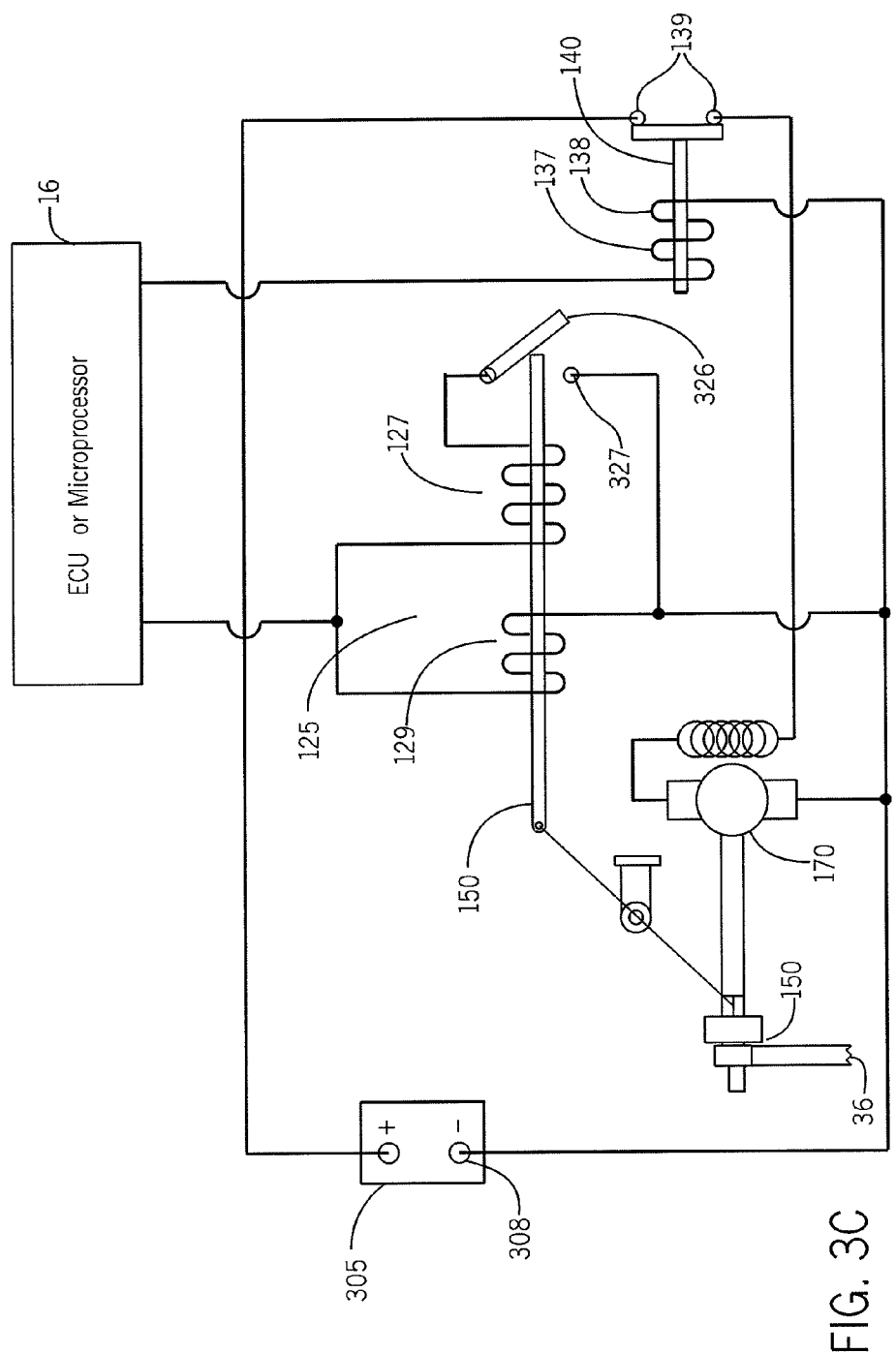
FIG. 3C is circuit diagram representing portions of a starter control system according to one embodiment of the invention.

In some embodiments, similar to conventional solenoid assemblies, the circulation of current through the first and second sets of solenoid windings can cause the plunger 135 to move due to magnetomotive force. For example, the solenoid assembly 125 can be configured and arranged so that the plunger 135 is drawn within the first and/or second set of solenoid windings 127,129, as shown in FIG. 3A-C, so that the windings 127,129 substantially circumscribe at least a portion of the plunger 135. Moreover, in some embodiments, the plunger 135 can comprise a plurality of sizes (e.g., multiple diameters, etc.). In some embodiments, as the plunger 135 moves through the first and second sets of solenoid windings 127,129 toward the second position, a distance between the plunger 135 and the windings 127,129 becomes smaller. For example, a size of an air gap between the plunger 135 and windings 127,129 reduces as the plunger 135 axially moves through the solenoid assembly 125 because portions of the plunger 135 with a greater size (e.g., circumference) pass through windings as the plunger 135 axially moves toward the second position. In some embodiments, lesser amounts of magnetomotive force are necessary to move the plunger 135 as the air gap decreases in size.

In some conventional starters, an end portion of the plunger 135 can engage a set of contacts to close a circuit that can route current from the power source 14 to the motor to start the engine 20 (e.g., transfer torque via the pinion 150 to the ring gear 36) when the plunger 135 is in the second position. Moreover, before and/or after the plunger 135 reaches the second position, the second set of solenoid windings 129 can become at least partially energized to retain the plunger 135 in position (e.g., the second set of solenoid windings 129 can function to hold the plunger 135 in the second position) and/or to complete the movement of the plunger 135 toward the second position. As a result of the plunger 135 being retained in the second position by the solenoid windings 127,129, current can continue to flow through the contacts and to the motor 170, which can lead to starting of the engine 20, similar to some previously described embodiments.

Figure 4:
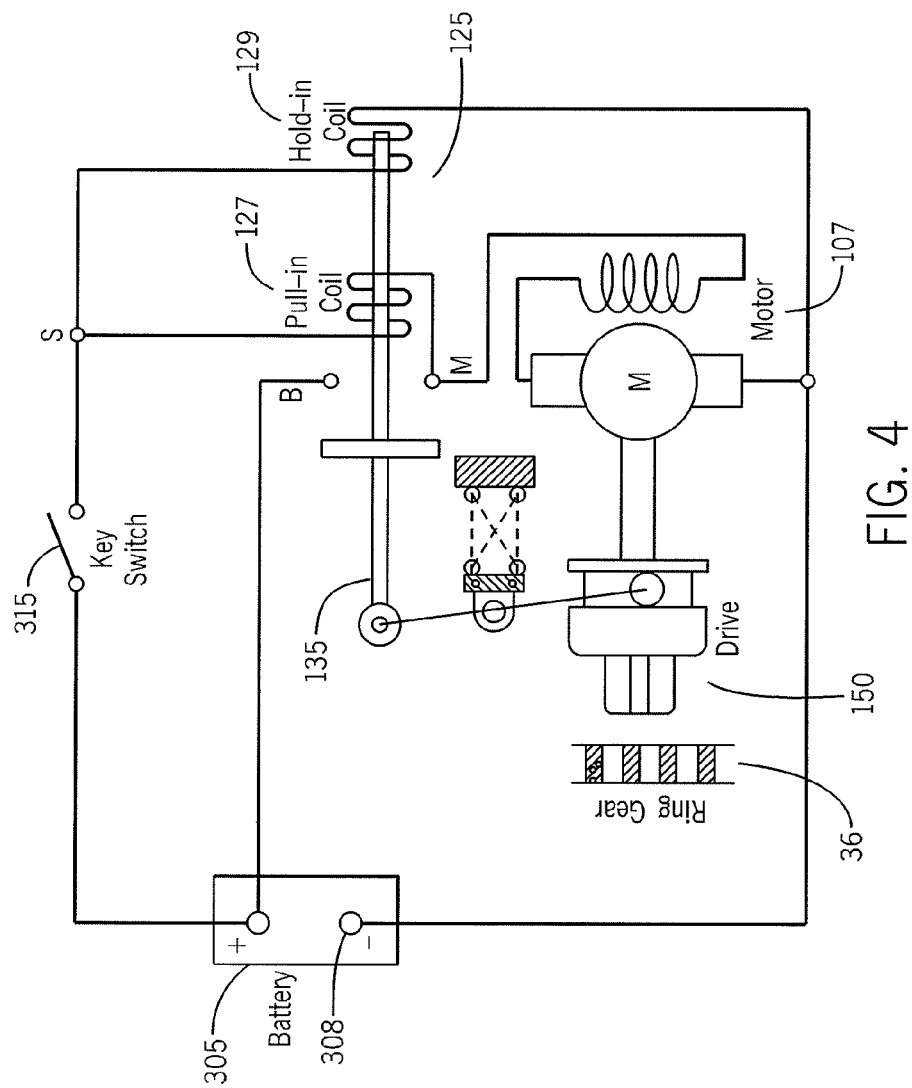
FIG. 4 is a circuit diagram representing portions of a conventional starter control system.

In some conventional starters, the first set of solenoid windings 127 can be at least partially inactivated by movement of the plunger 135. As shown in FIG. 4, when the plunger 135 engages the contacts, the first set of solenoid windings 127 can be substantially prevented from functioning. For example, by engaging the contacts, the plunger 135 can disable (e.g., "short circuit") the first set of solenoid windings 127 and the second set of solenoid windings 129 can function to retain the plunger 135 in position because of the reduced need for magnetomotive force, as previously mentioned. The first and the second sets of solenoid windings 127,129 can also be activated and deactivated at the same time.

In some embodiments, the solenoid assembly 125 can comprise multiple configurations. Referring to FIGS. 3A-3C, in some embodiments, at least one of the sets of solenoid windings 127,129 can be reversibly coupled to ground through contacts of a first switch 327. As shown in FIGS. 3A-3C, the first switch 327 is shown as being in between solenoid winding 127 and ground, and is therefore capable of operating as a ground switch, In some other embodiments, the switch 327 could also be placed in between the solenoid winding 127 and the pin P2, enabling functions other than operating as a ground switch. For example, as shown in FIGS. 3A-3C and 5, in some embodiments, a contactor or other coupling member 326 can be disposed between two contacts to electrically couple the first set of solenoid windings 127 to ground. In some embodiments, movement of the plunger 135 toward the second position, via magnetomotive force produced by the solenoid windings 127,129, can at least partially move the coupling member 326 that is disposed between the contacts. As a result of the plunger 135 moving the coupling member 326, the connection between the first set of solenoid windings 127 and ground, or the connection between the solenoid winding 127 and the pin P2, can be disrupted, and, accordingly, current will substantially or completely cease flowing through the first set of solenoid windings 127. Moreover, the first set of solenoid windings 127 cease producing magnetomotive force when the flow of current ceases. The second set of solenoid windings 129 can continue to move the plunger 135 and retain the plunger 135 in position after current ceases to flow through the first set of solenoid windings 127. In some embodiments, the contactor or coupling member 326 can comprise a spring-loaded configuration that can be free to move in a translational manner, as shown in FIG. 3B or can comprise a spring-loaded configuration that can be free to move in a generally rotational manner (e.g., one portion of the contactor or coupling member 326 can remain substantially stationary and another portion can move), as shown in FIG. 3C.

In some embodiments, the starter 12 can comprise a secondary solenoid assembly 137, as shown in FIGS. 3A, 3B, 3C and 5. In some embodiments, the secondary solenoid assembly 137 can comprise a portion of the previously-mentioned solenoid assembly 125, and, in other embodiments, the secondary solenoid assembly 137 can be coupled to the housing 115 and/or other portions of the starter 12 and in electrical communication with other elements of the starter control system 10, as shown in FIGS. 3A, 3B, and 3C. Furthermore, in some embodiments, the secondary solenoid assembly 137 can comprise one or more magnetic switches.

In some embodiments, the secondary solenoid assembly 137 can comprise a set of third solenoid windings 138 and a second plunger (shown as 140) and a set of secondary solenoid assembly contacts 139. As described in further detail below, in some embodiments, upon passing current through the third solenoid winding 138, the second plunger 140 can move toward the set of secondary solenoid assembly contacts 139, which, upon engagement with the plunger, can close at least a portion of a circuit to enable current flow to the motor of the starter 12 to begin rotating the motor 170.

In some embodiments, the solenoid assembly 125 and secondary solenoid assembly 137 can be electrically coupled to the control module 16. For example, the control module 16 can comprise an electronic control module 16 or a microprocessor in communication with the sensors 18a,18b and 18c disposed throughout the starter control system 10. In some embodiments, the two or more pins (e.g. P1 and P2 in FIG. 5 can at least partially provide for a gateway for current passing from a current source (e.g., the battery 14) when the signals are pins received from the electronic control module 16. For example, in some embodiments, signals can be sent from the electronic control module 16 that a starting event must occur. As a result, signals from the electronic control module 16 can be energized and current can flow from the current source through the pins P1 and P2 to the solenoid assembly 125 and/or the secondary solenoid assembly 137 to function as previously mentioned. In some embodiments, one or more switches (e.g., magnetic switches) can be disposed between the electronic control module 16 and one or both of the pins P1, P2. The magnetic switches may be necessary to convert a low power current from the electronic control module 16 (typically less than 4 amps) to a higher power current (typically 20-30 amps) to allow the pins P1 and P2 to have enough power to effectively control the solenoid windings 127, 129 and 138.

Moreover, although depicted and referenced as "pins," in some embodiments, these features can comprise other configurations, such as bolts or other structures capable of regulating and/or transmitting current to and from portions of the starter control system 10.

In some embodiments, by including two or more pins, separate amounts of current can be circulated through separate circuits. In some embodiments, pin P1 connects the current source and the secondary solenoid assembly 137 and pin P2 connects the current source and the first and second sets of solenoid windings 127,129. For example, pin P2 can be configured and arranged for a relatively small current load (e.g., 30 amps) so that the first and second sets of solenoid windings 127,129 can receive sufficient current. Moreover, in some embodiments, pin P1 can be configured and arranged for a greater current load (e.g., 40-1000 amps) so that the secondary solenoid assembly 137 can receive sufficient current. Furthermore, by including two or more pins, the first and second solenoid windings 127,129 can receive current independently of the secondary solenoid assembly 137. Additionally, by including two or more pins, the electronic control module 16 can assess and control timing of pinion 150 engagement and motor 170 movement. By way of example only, in some embodiments, the electronic control module 16 can activate pin P1 to begin motor 170 movement and can then activate pin P2 to engage the pinion 150 and ring gear 36. In other situations, the activation order of the pins P1, P2 and their downstream components can be reversed and/or performed simultaneously, as described in an exemplary embodiment below.

In some embodiments, the starter control system 10 can comprise additional configurations, as shown in FIGS. 6A-6C. As shown in FIGS. 6A-6C, in some embodiments, the system can comprise one or more switches electrically coupled to the electronic control module 16. For example, at least some of the switches can comprise magnetic switches. As shown in FIGS. 6A-6C, the system can comprise two magnetic switches 350, 355 in communication with the electronic control module 16. In some embodiments, the switches 350, 355 can comprise other configurations, such as solid-state switches, or any other structure capable of functioning as a switch. Moreover, although future references to the switches use the terms "magnetic switches," this is not to be construed as limiting the scope of this disclosure only to magnetic switches. Additionally, in some embodiments, the starter control system 10 can comprise a combination of switches (e.g., at least one magnetic switch and at least one solid-state switch).

Figure 5:
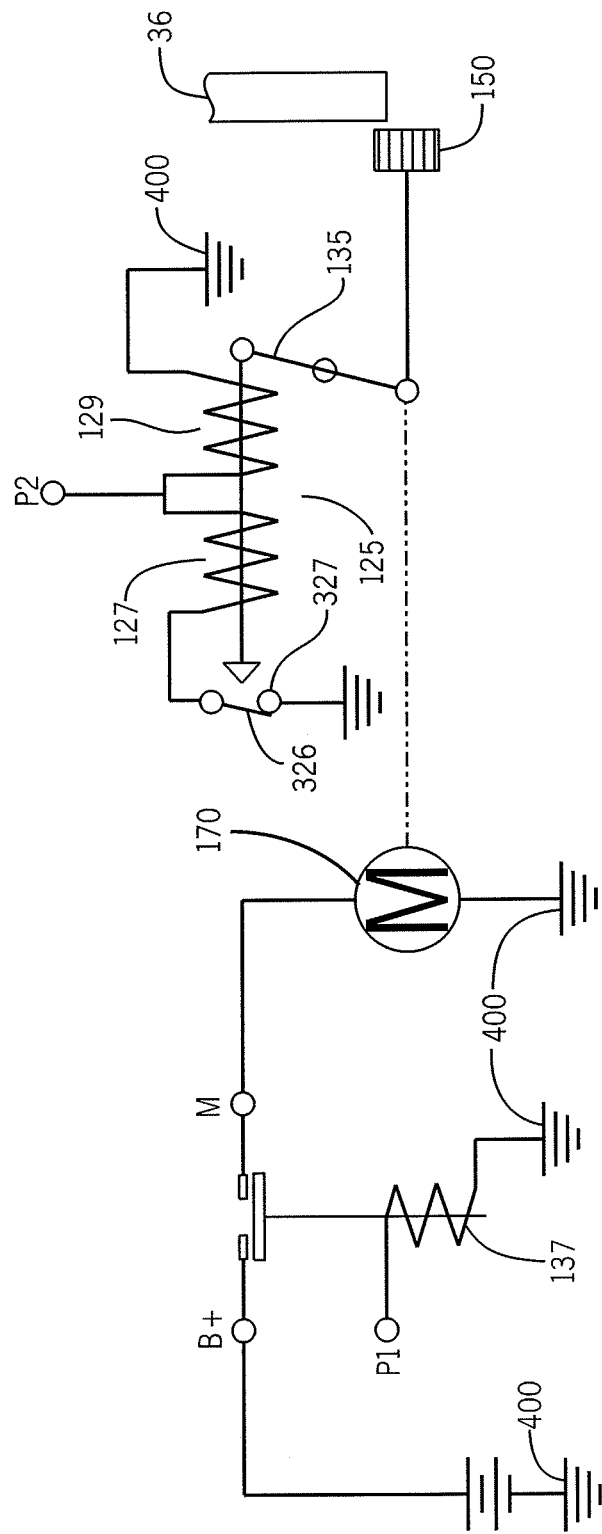
FIG. 5 is a circuit diagram representing portions of a starter control system according to one embodiment of the invention.

Moreover, in some embodiments, the first and second magnetic switches 350, 355 can be coupled to the electronic control module 16 via one or both of the pins P1, P2 (not shown in FIG. 6A, 6B, 6C, but shown as P1 and P2 in FIG. 5). For example, pin P2 can be disposed between the first magnetic switch 350 and the electronic control module 16 and pin P1 can be disposed between the second magnetic switch 355 and the electronic control module 16. In other embodiments, the pin arrangement can be reversed or both switches can be coupled to one pin (e.g., pin P1 or pin P2).

In some embodiments, upon receiving one or more signals from one or more sensors 18a,18b, 18c, a first magnetic switch 350 can be energized so that a plunger 351 of the first magnetic switch 350 can be moved (e.g., via magnetomotive force) toward a first set of contacts 352. Upon engaging the first set of contacts 352, the plunger 351 can close a portion of the circuit so that current can flow to downstream elements. Similarly, in some embodiments, the electronic control module 16 can energize a second magnetic switch 355 upon receiving the same or a different signal from the sensors 18a,18b, 18c. As a result of the second magnetic switch 355 being energized, a plunger 356 of the second magnetic switch 355 can be moved (e.g., via magnetomotive force) toward a second set of contacts 357. Upon engaging the second set of contacts 357, the plunger 356 can close a portion of the circuit so that current can flow to some downstream elements.

In some embodiments, the first and second magnetic switches 350, 355 can be configured and arranged to control current flow to different downstream elements. As shown in FIG. 6A, in some embodiments, the first magnetic switch 350 can at least partially control current flow to the solenoid assembly 125. For example, upon receiving a signal from the electronic control module 16 that the pinion 150 should be engaged with the ring gear 36, the electronic control module 16 can energize the first magnetic switch 350, which can energize the first and second sets of solenoid windings 127, 129 to lead to engagement of the pinion 150 and the ring gear 36, as previously mentioned. Furthermore, before, after, or at the same time as energizing the first magnetic switch 350, in some embodiments, upon receiving the same or a different signal, the electronic control module 16 can energize the second magnetic switch 355. As a result of energizing the second magnetic switch 355, the plunger 356 can close the second set of contacts 357, which can enable current to flow, which can, immediately or eventually, energize the motor 170.

In some embodiments, the first and second magnetic switches 350, 355 can enable energization of different downstream elements. As shown in FIG. 6B, in some embodiments, the first magnetic switch 350 can control current flow to the first set of solenoid windings 127 and the second magnetic switch 355 can control current flow to the secondary solenoid assembly 137 and the second set of solenoid windings 129. For example, as shown in FIG. 6B, in some embodiments, the second set of solenoid windings 129 can be coupled to the circuit controlled by the second magnetic switch 355 and can be disposed in a parallel configuration with respect to the secondary solenoid assembly 137. In some embodiments, the second set of solenoid windings 129 can be disposed in a series configuration with respect to the secondary solenoid assembly 137.

As a result of this configuration, upon receiving a signal from the electronic control module 16 that the pinion 150 should be engaged with the ring gear 36, the electronic control module 16 can energize the first magnetic switch 350, which can energize the first set of solenoid windings 127 to begin moving the pinion 150 toward the ring gear 36 by moving the plunger 135 toward the second position. Furthermore, before, after, or at the same time as energizing the first magnetic switch 350, in some embodiments, upon receiving the same or a different signal, the electronic control module 16 can energize the second magnetic switch 355. As a result of energizing the second magnetic switch 355, the plunger 356 can close the second set of contacts 357, which can enable current to flow to immediately or eventually energize the motor 170. Additionally, energizing the second magnetic switch 355 can result in current flowing to the second set of solenoid windings 129 to aid in completing or retaining the pinion 150 engagement with the ring gear 36. In some embodiments, as shown in FIG. 6C, the secondary set of solenoid windings 129 can comprise a great enough magnetomotive force to retain the plunger 135 in the second position, but may also be configured and arranged so that the plunger 135 does not move from the first position toward the second position. In some embodiments, by energizing the first set of solenoid windings 127, the magnetomotive force produced by the first set of solenoid windings 127 can be sufficient to substantially or completely move the plunger 135 to the second position. In other embodiments, it may be necessary to energize the second set of solenoid windings 129 (e.g., via the second magnetic switch 355) to substantially or completely move the plunger 135 to the second position.

In some embodiments, the activation of some or all of the previously mentioned elements can be differently configured. For example, as described in further detail below, it may be desirable to begin activation of the motor 170 prior to moving the pinion 150 into an engagement position with the ring gear 36. Accordingly, by initially energizing the second magnetic switch 355, the starter control system 10 can activate the motor 170 prior to engaging the pinion 150 and the ring gear 36. Moreover, as previously mentioned, in some embodiments, the second set of solenoid windings 129 can comprise a greater resistance and a lesser current (e.g., relative to the first set of solenoid windings 127) so that even when a voltage is applied to the second set of solenoid windings 129, these windings cannot generate sufficient magnetomotive force to move the plunger 135. For example, in some embodiments, the solenoid assembly 125 can comprise one or more biasing forces (e.g., springs) to retain the plunger 135 in the first position and return the plunger 135 to the first position after the first and second sets of solenoid windings 127,129 are de-energized. Accordingly, by activating only the second set of windings 129 via the second magnetic switch 355, the plunger 135 can remain in the first position until the first set of solenoid windings 127 are completely or partially energized. Since the second set of solenoid windings 129 has higher resistance and therefore lower current flowing through the second set of solenoid windings 129, the electronic control unit 16 can de-energize the first set of solenoid windings 127 before de-energizing the second set of solenoid windings 129 to lower the current draw through the solenoid assembly 125.

Moreover, because the first and second sets of solenoid windings 127,129 are controlled by different magnetic switches 350,355, the sets of solenoid windings 127,129 can be differentially regulated. For example, before, after, or at the same time as activation of the second set of solenoid windings 129, the electronic control module 16 can de-energize the first magnetic switch 350 so that the first set of solenoid windings 127 is substantially or completely deactivated. As a result, in some embodiments, the starter control system 10 can function without the connector or coupling member 326 to deactivate the first set of solenoid windings 127; however, the system can still comprise the connector or coupling member 326 to inactivate the first set of solenoid windings 127 in addition to, or in lieu of, the first magnetic switch 350 configuration.

As shown in FIG. 6C, in some embodiments, the starter control system 10 can comprise other configurations. Similar to the embodiment illustrated by FIG. 6B, in some embodiments, the first magnetic switch 350 can control energization of the first set of solenoid windings 127 and the second magnetic switch 355 can control energization of the secondary solenoid assembly 137. In some embodiments, the combination of the activation of the first and second magnetic switches 350,355 can provide current to the second set of solenoid windings 129. For example, after the electronic control module 16 energizes the first magnetic switch 350, current can begin passing through the first set of solenoid windings 127, which can lead to the plunger 135*a* moving toward the second position. Upon the plunger 135*a* reaching the second position, the end of the plunger 135*a* can close a set of secondary solenoid assembly contacts 139 that couple together the second set of solenoid windings 129 and circuitry connecting the secondary solenoid assembly 137 and the second magnetic switch 355, as shown in FIG. 6C (e.g., the second set of solenoid windings 129 can be wired in series with the set of contacts and can be wired in parallel with respect to the third solenoid winding 138). Additionally, in some embodiments, the set of contacts adjacent to the second position can comprise a solid-state switch or any other switch that can be configured and arranged to control current to the second set of solenoid windings 129.

As a result, when the electronic control module 16 energizes the second magnetic switch 355 (e.g., before, after, or at the same time as when the first magnetic switch 350 is energized), current can then pass through the second set of solenoid windings 129 to retain the plunger 135 in the second position. Furthermore, similar to some previously-mentioned embodiments, the first and second set of solenoid windings 127,129 can be differentially regulated because the first set of solenoid windings 127 can be energized and de-energized by the first magnetic switch 350 and the second set of solenoid windings 129 can be substantially controlled by the second magnetic switch 355 after the plunger 135 reaches the second position.

In some embodiments, the starter control system 10 can comprise a plurality of sensors in communication with the electronic control module 16. For example, as shown in FIGS. 6A-6C, the system can comprise at least one pinion speed sensor 18*c*. In some embodiments, the pinion speed sensor 18*c* can be coupled to a portion of the starter 12 and can be in sensing communication with the pinion 150 and/or the shaft coupling the pinion 150 to the motor 170 or the gear train 165. For example, in some embodiments, the pinion speed sensor 18*c* can be coupled to a portion of the housing 115 substantially adjacent to the pinion 150 so that the pinion speed sensor 18*c* can assess and/or transmit any speed data sensed regarding the movement of the pinion 150. In other embodiments, the pinion speed sensor 18*c* can be coupled to other portions of the system so that it can sense movement of the pinion 150. In some embodiments, the pinion speed sensor 18*c* can be in communication (e.g., wired or wireless communication) with the electronic control module 16 so that data transmitted by the pinion speed sensor 18*c* can be received and processed by the electronic control module 16.

As shown in FIGS. 6A-6C, in some embodiments, the starter control system 10 can comprise one or more ring gear speed sensor 18*b*. In some embodiments, the ring gear speed sensor 18*b* can be coupled to a portion of the engine 20 and can be in sensing communication with the ring gear 36 and/or the crankshaft. For example, in some embodiments, the ring gear speed sensor 18*b* can be coupled to a portion of the engine 20 substantially adjacent to the ring gear 36 so that the ring gear speed sensor 18*b* can assess and/or transmit any speed data sensed regarding the movement of the ring gear 36. In other embodiments, the ring gear speed sensor 18*b* can be coupled to other portions of the system so that it can sense movement of the ring gear 36. In some embodiments, the ring gear speed sensor 18*b* can be in communication (e.g., wired or wireless communication) with the electronic control module 16 so that data transmitted by the ring gear speed sensor 18*b* can be received and processed by the electronic control module 16.

The following description is intended for illustrative purposes only and is not intended to limit the scope of this disclosure. Some embodiments of this invention can enable a user to regulate operations of the starter 12 via the starter control system 10. In some embodiments, the system can function in response to a signal. For example, the signal can comprise one or more of a starting event in a vehicle in which the vehicle has been stopped and the engine 20 has been inactive for more than a brief period (e.g., a "cold start" starting event), a starting event in a vehicle in which the vehicle continues to be in an active state (e.g., operational) and the engine 20 has been only temporarily inactive (e.g., a "stop-start" starting event), and a starting event in a vehicle in which the vehicle continues to be in an active state (e.g., operational) and the engine 20 has been deactivated, but continues to move (e.g., a "change of mind stop-start" starting event).

In some embodiments, as a result of the electronic control module 16 receiving one or more of the previously mentioned signals, the module can control current flow through the starter control system 10. In some embodiments, the electronic control module 16 can provide a signal to one or both of the pins P1, P2 so that current can flow to the solenoid assembly 125 and/or the secondary solenoid assembly 137 (e.g., via the first and/or second magnetic switches 350,355). For example, before, after, or during energizing the first and second solenoid windings 127,129, current can flow, via pin P1 and the second magnetic switch 355, to the secondary solenoid assembly 137 to energize the solenoid windings 138 in the secondary solenoid assembly 137 to move the second plunger 140 to close the secondary solenoid assembly contacts 139 to enable current flow to the motor 170. As a result of current flowing to the motor 170, the pinion 150 can begin to rotate.

Moreover, in some embodiments, before, during, or after energizing the secondary solenoid assembly 137, current can flow, via pin P2 and the first and/or second magnetic switches 350,355, to the first and second solenoid windings 127,129 to move the plunger 135 from the first position toward the second position. As a result, during movement of the plunger 135 toward the second position, the coupling member 326 can be at least partially displaced, which can lead to inactivation of the first set of solenoid windings 127. The second set of solenoid windings 129 can continue to move the plunger 135 until disposed in the second position and can further retain the plunger 135 in the second position. Moreover, because of the movement of the plunger 135, the pinion 150 can be moved toward the ring gear 36 of the engine 20, where it can engage the ring gear 36 to rotate and help start the engine 20.

The following examples illustrate functioning of some different starting events according to some embodiments of the invention. For example, in some embodiments, the first and/or second sets of solenoid windings 127,129 can be energized so that the plunger 135 is moved from the first position to the second position to engage or abut the pinion 150 with the ring gear 36. In some embodiments, once the pinion 150 is engaged with or abutted to the ring gear 36, the electronic control module 16 can energize the second set of solenoid windings 129 if they are not already energized, to maintain the pinion 150 in position and the electronic control module 16 can also substantially simultaneously de-energize the first set of solenoid windings 127. Moreover, once the pinion 150 is substantially adjacent to the ring gear 36 (e.g., engaged or abutted), the electronic control module 16 can energize the secondary solenoid assembly 137 to energize the motor 170 and move the pinion 150 (e.g., rotate or spin the pinion 150). In some embodiments, in addition to or in lieu of sensing pinion 150 engagement or abutment, the electronic control module 16 can delay energizing the secondary solenoid assembly 137 and/or the second set of solenoid windings 129 by a predetermined amount of time to allow the pinion 150 enough time to abut or engage the ring gear 36. After the electronic control module 16 determines that the engine 20 has started, it can de-energize the secondary solenoid assembly 137 to de-energize the motor 170 and the second set of solenoid windings 129 to disengage the pinion 150 and the ring gear 36.

As described in further detail below, in some embodiments, the starter control system 10 can be configured and arranged to engage the pinion 150 and the ring gear 36 when the speeds of both of these elements is substantially synchronous. As previously mentioned, some embodiments can be used in connection with multiple types of starting events. Some embodiments of the invention can be used in connection with some start-stop starting events. Some vehicles can be configured and arranged so that engine 20 operations can be disabled, however, other systems (e.g., electrical systems) can continue to operate. For example, in some embodiments, the electronic control module 16 or other vehicle control systems can sense that the engine 20 is operating at near or at idle speeds and/or the vehicle is in a condition where engine 20 output is not needed, and, as a result, can deactivate the engine 20 (e.g., shut off the engine's fuel source, open or close any number of valves, and/or take any other actions necessary to deactivate the engine 20). During the period of engine inactivity, some or all of the systems of the vehicle can continue to operate at full or partial capacity with power provided by the battery or other power-supplying apparatuses. Accordingly, vehicles comprising this configuration can consume lesser amounts of fuel and output lesser amounts of undesirable by-products.

Vehicles comprising one or more of the previously-mentioned stop-start configurations can require a starting event after engine deactivation. As previously mentioned, in some embodiments, the starter control system 10 can be configured and arranged to start the engine 20 after the engine 20 is completely inactivated (e.g., the crankshaft and/or the ring gear 36 have ceased moving) or can be configured and arranged to re-start the engine 20 when the engine 20 has received a signal to inactivate, but is progressing toward becoming inactive, including when the ring gear 36 continues to move. For example, the engine 20 can receive a signal to inactivate (e.g., from the electronic control module 16 or other control systems) and the engine's fuel supply can be disconnected and the engine 20 can begin to inactivate, as measured by a decrease in engine revolutions per minute ("RPM") (e.g., the engine RPM values continue to substantially decrease while the engine 20 is coasting toward a substantially zero RPM value). However, before the RPM levels reach and remain at zero, the vehicle receives a signal to begin engine operations (e.g., a "change-of-mind" event), such as a vehicle user actuating an accelerator pedal. As discussed below, some embodiments of the invention can enable the vehicle to re-start the engine 20 during this change-of-mind event.

In some embodiments, operations of the starter control system 10 can be at least partially determined by the speed of the engine 20 (e.g., as conveyed by speeds of the crankshaft and/or the ring gear 36) when the electronic control module 16 receives a restart signal. For example, the ring gear 36 sensor can sense and transmit a speed of the ring gear 36 to the electronic control module 16, which can process the ring gear speed data and assess the necessary actions to be taken by the starter control system 10 in order to start the engine 20. As described in greater detail below, the starter control system 10 can start the engine 20 in different manners, depending on the speed sensed by the ring gear speed sensor 18b.

Figure 7:
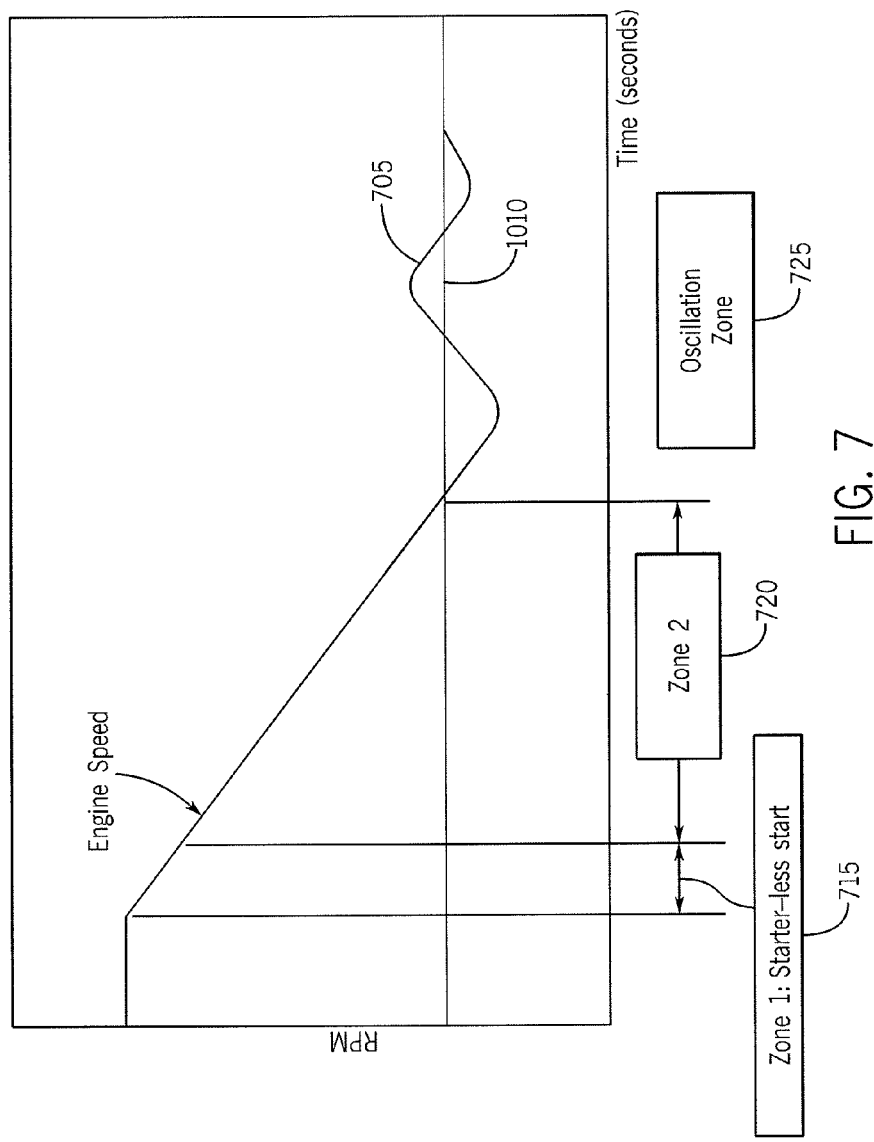
FIG. 7 is a graph representing engine speeds and engine restart zones according to some embodiments of the invention.

As shown in FIG. 7, in some embodiments, after the electronic control module 16 transmits a deactivation signal to the engine (e.g., severing the engine's fuel supply), a time span until the engine 20 comes to a complete rest (e.g., remains at zero RPM) can be divided into one or more zones 715, 720, 725. For example, as shown in FIG. 7, the time span can comprise multiple zones. In some embodiments, the time between receiving an engine 20 deactivation signal (e.g., when the speed of the engine begins to reduce in magnitude) and the time the engine speed remains at zero RPM can be divided into a first zone 715, a second zone 720, and an oscillation zone 725.

In some embodiments, the first zone 715 can comprise a range of engine speeds where the engine 20 can be restarted without the need for assistance by the starter 12. In some embodiments, the first zone 715 can comprise the range of engine speeds where the reintroduction of fuel or the opening and/or closing of some engine 20 valves can enable the engine 20 to restart without the need for the engagement of the pinion 150 and the ring gear 36. For example, in some embodiments, the electronic control module 16 can receive a restart signal (e.g., the user actuating the acceleration pedal and/or de-actuating a brake pedal). As result of the restart signal, the electronic control module 16 can initially process the engine speed, as measured by the speed of the ring gear 36 via the ring gear speed sensor 18b, and determine that the speed is within the first zone (e.g., a speed greater than 400 RPM). The electronic control module 16 can then operate to enable the restarting of the engine 20 (e.g., the reintroduction of fuel to the engine 20 or the opening/closing of engine 20 valves, etc.). After providing instructions to components of the system to restart the engine 20, the electronic control module 16 can assess whether the engine 20 successfully started, and if the engine speed begins to increase (e.g., the engine 20 successfully started), normal operations of the vehicle can continue. If the engine speed continues to decrease (e.g., the restart event failed), the electronic control module 16 can either attempt the same restart operations detailed above or, if the engine speed drops into the second zone 720 range, the electronic control unit 16 can proceed under the second zone 720 procedures, as detailed below.

Figure 8:
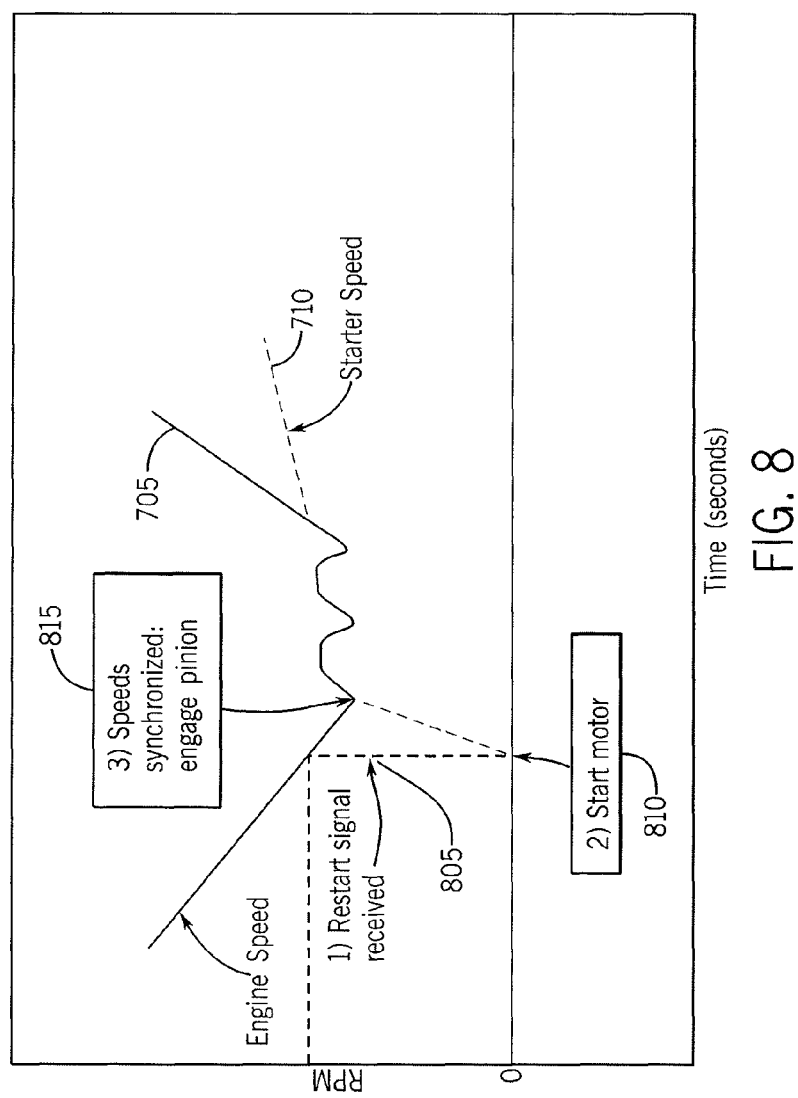
FIG. 8 is a graph representing a restart event according to one embodiment of the invention.

In some embodiments, the second zone 720 can comprise a range of engine speeds where the engine 20 requires assistance from the starter 12 in order to restart the engine 20. For example, in some embodiments, the second zone 720 can comprise a range of speeds that reach from where the engine 20 exits the first zone 715 to where the engine 20 enters the oscillation zone 725. For example, in some embodiments, the electronic control module 16 can receive a restart signal (e.g., the user actuating the acceleration pedal and/or de-actuating a brake pedal) and the electronic control module 16 can initially process the engine speed, as measured by the speed of the ring gear 36 via the ring gear speed sensor 18b, and determine that the speed is within the second zone, as shown in FIGS. 7 and 8.

In some embodiments, after receiving the restart signal, once the electronic control module 16 determines that the engine speed falls within the second zone 720, the electronic control module 16 can transmit signals to portions of the starter control system 10 to begin moving the motor 170. For example, in some embodiments, the electronic control module 16 can provide a signal to the second magnetic switch 355 to close the second set of contacts 357 to connect the battery and the secondary solenoid assembly 137. As a result, the secondary solenoid assembly 137 can close the circuit between the battery 14 and the motor 170, which can result in the motor 170 beginning to move (e.g., rotate or otherwise move). As previously mentioned, the movement of the motor 170 can be translated to the pinion 150, as illustrated in FIG. 8.

In some embodiments, the electronic control module 16 can monitor the relative speeds of the pinion 150 and ring gear 36 via the pinion speed sensor 18c and the ring gear speed sensor 18b, respectively. Referring to FIG. 8, in some embodiments, once the electronic control module 16 determines that the ring gear speed and the pinion speed are substantially or completely synchronized 815, the electronic control module 16 can activate the first magnetic switch 350 to activate at least one of the first and second sets of solenoid windings 127,129. By way of exemplary explanation, at least a portion of the pinion speeds are generally normalized to ring gear speeds. More specifically, generally ring gears 36 comprise a greater size (e.g., a greater diameter) than the pinion 150, and, accordingly, the pinion speed mentioned in this disclosure includes pinion 150 rotational speed after normalizing to a gear ration. By way of example only, if the gear ratio of the ring gear 36 to the pinion 150 is about 15:1 and the actual pinion speed is 4500 RPM, then the pinion speed would be normalized to about 300 RPM.

As previously mentioned, in some embodiments, the first magnetic switch 350 can activate only the first set of solenoid windings 127 so that the plunger 135 of the solenoid assembly 125 is moved from the first position toward the second position. In some embodiments, energizing the first magnetic switch 350 can activate the first and second sets of solenoid windings 127,129 so that both sets of windings can work to move the plunger 135 toward the second position. Moreover, once the plunger 135 is substantially adjacent to the second position or reaches the second position, the first set of solenoid windings 127 can be substantially or completely deactivated and the second set of solenoid windings 129 can be activated or remain activated, depending on the configuration of the solenoid assembly 125.

In some embodiments, regardless of configuration, once the plunger 135 reaches the second position, the pinion 150 can engage the ring gear 36 or can substantially or completely abut the ring gear 36 (e.g., the pinion 150 can be disposed immediately adjacent to the ring gear 36). For example, the electronic control module 16 can determine when the engine speed and the pinion speed are substantially or completely synchronized (e.g., the difference in speeds comprises a value less than about 10% of the speed of the ring gear 36 or the difference in speeds comprises less than 5-10 RPM) and can activate the first magnetic switch 350 to engage the pinion 150 and the ring gear 36. As a result of engaging the pinion 150 and ring gear 36 when their speeds are substantially or completely synchronous, wear on teeth of the pinion 150 and ring gear 36 can be at least partially reduced.

After engaging the pinion 150 and the ring gear 36, the electronic control module 16 can assess whether the engine 20 successfully started, and if the engine speed begins to increase (e.g., the engine 20 successfully started), normal operations of the vehicle can continue. For example, the pinion 150 can disengage from the ring gear 36 and the electronic control module 16 can inactivate the solenoid assembly 125 and the secondary solenoid assembly 137. If the engine speed continues to decrease (e.g., the restart event failed), the electronic control module 16 can either attempt the same restart operations detailed above or, if the engine speed drops into the oscillation zone range 725, the electronic control unit can proceed under the oscillation zone procedures, as detailed below.

Figure 9:
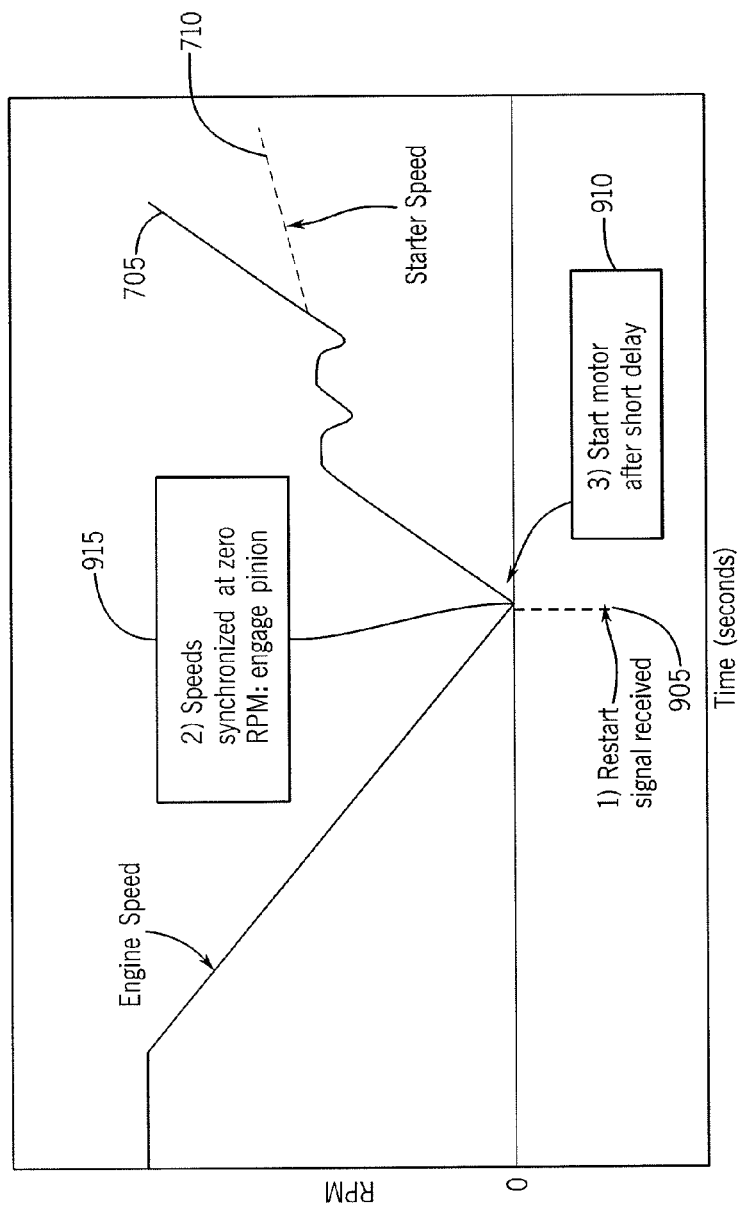
FIG. 9 is a graph representing a restart event according to one embodiment of the invention.
Figure 10:
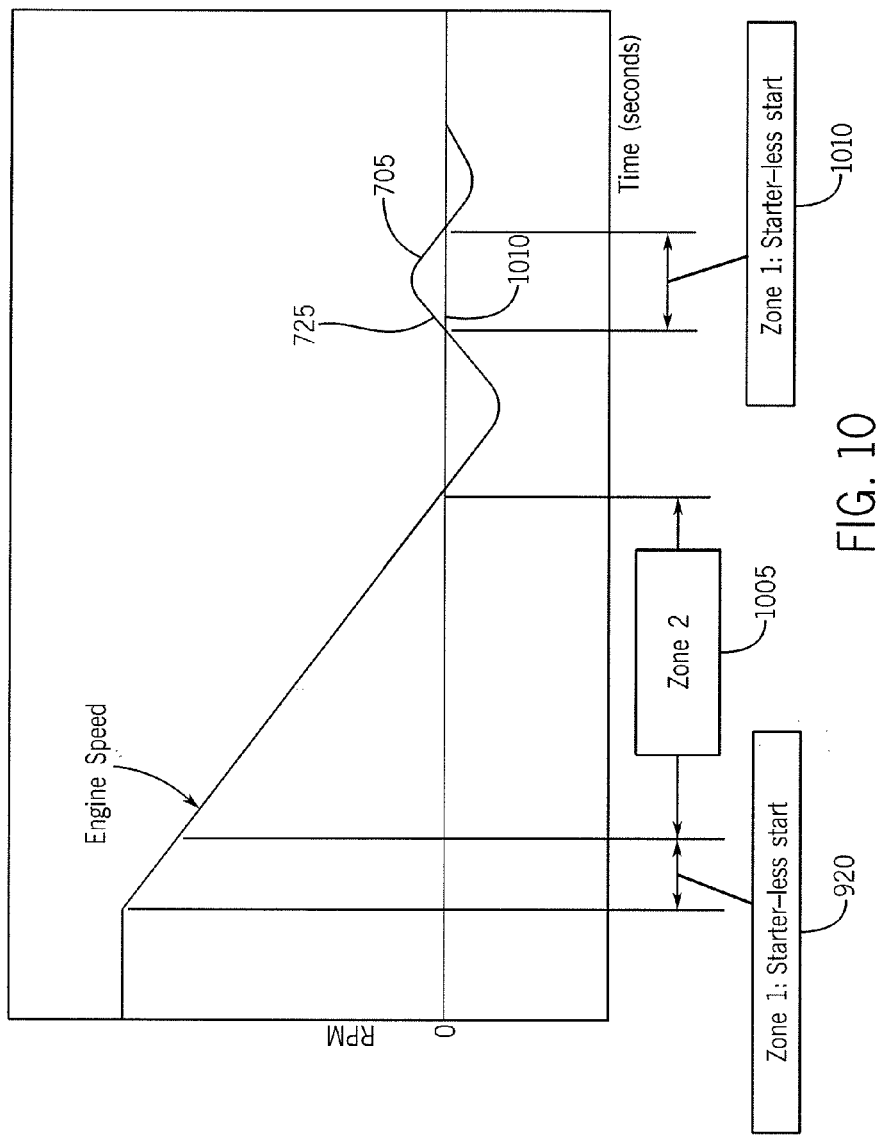
FIG. 10 is a graph representing engine speeds and engine restart zones according to some embodiments of the invention.

In some embodiments, the oscillation zone 725 can comprise a range of engine speeds where the engine 20 requires assistance from the starter 12 in order to restart the engine 20. For example, in some embodiments, the oscillation zone 725 can comprise a range of speeds that extend from where the speed of the engine 20 is initially a value of zero RPM to a position where the engine 20 comes to a complete rest (e.g., where the engine 20 ceases movement). As shown in FIGS. 9 and 10, after the speed of the engine 20 is substantially adjacent to a zero RPM value, the engine speed can begin oscillating in value. Because of the weight of the engine 20 components and their relative inertial values, as the engine 20 nears complete inactivity, the ring gear 36 and crankshaft can oscillate between positive and negative values (e.g., the ring gear 36 and crankshaft can move in both clockwise and counterclockwise directions). As shown in FIGS. 7 and 10, unless the electronic control module 16 transmits instructions to starter 12 to start the engine 20, the speed of the engine 20 will eventually reach and remain at zero RPM.

In some embodiments, after receiving a restart signal (shown for example as 805 in FIG. 8, 905 in FIG. 9, 1015 in FIG. 11, 1215 in FIG. 12), once the electronic control module 16 determines that the engine speed falls within the oscillation zone (shown as 725 in FIG. 7), the electronic control module 16 can transmit signals to portions of the starter control system 10 that depend upon the speed of the ring gear 36 within the oscillation zone 725. For example, in some embodiments, the electronic control module 16 can attempt to restart the engine 20 in the oscillation zone 725 at or near points where the engine speed substantially comprises a zero RPM value. In some embodiments, the points can include a first point (see 910 in FIG. 9) after the engine speed initially crosses the zero RPM threshold, or the second point (see 1105 in FIG. 12) after the engine speed transitions from negative to positive speed or any other later point where the engine speed is at or near zero RPM. As shown in FIG. 9, the electronic control module 16 can receive a restart signal near a time where the engine speed value initially crosses the zero RPM threshold 905. As a result of receiving the restart signal, the electronic control module 16 can energize the first magnetic switch 350 to activate the solenoid assembly 125 to move the plunger 135 and engage the pinion 150 and the ring gear 36. For example, in some embodiments, the pinion 150 need not be moving upon the initial engagement because the ring gear speed is at or substantially near to a zero RPM value so that the speed of the pinion 150 and the speed of the ring gear 36 are substantially or completely synchronized at engagement (e.g., both speeds comprise substantially or exactly zero RPM at engagement).

After abutment, engagement, or during engagement, the electronic control module 16 can energize the second magnetic switch 355 to activate the secondary solenoid assembly 137 and energize the motor 170. In some embodiments, the electronic control module 16 can energize the first magnetic switch 350 and then energize the second magnetic switch 355 at a later time point. As a result of energizing the motor 170, in some embodiments, the engaged pinion 150 can begin to move and cause the ring gear 36 to move and start the engine 20, as shown in FIG. 9. Moreover, the electronic control module 16 can assess whether the engine 20 successfully started, and if the engine speed begins to increase (e.g., the engine 20 successfully started, shown as rising slope of engine speed 705), normal operations of the vehicle can continue. For example, the pinion 150 can disengage from the ring gear 36 and the electronic control module 16 can inactivate the solenoid assembly 125 and the secondary solenoid assembly 137. If the engine speed continues to decrease (e.g., the restart event failed), the electronic control module 16 can either attempt the same restart operations detailed above or, if the engine speed continues in the oscillation zone range 725, the electronic control unit 16 can proceed to make further attempts to restart the engine 20, as detailed below.

In some embodiments, the oscillation zone can comprise a third zone 1010 of engine speed, as shown in FIG. 10. In some embodiments, the third zone 1010 can comprise a range of engine speeds that fall within the oscillation zone 725 where the engine speed is a positive value, as indicated in FIG. 10. In some embodiments, in the third zone 1010, the starter control system 10 can function in a manner substantially similar to the second zone 1005. Moreover, as shown in FIGS. 7 and 10, the oscillation zone can comprise a plurality of third zones 1010, and, the starter control system 10 can function to restart the engine 20, as described below, in any of the third zones 1010.

Figure 11:
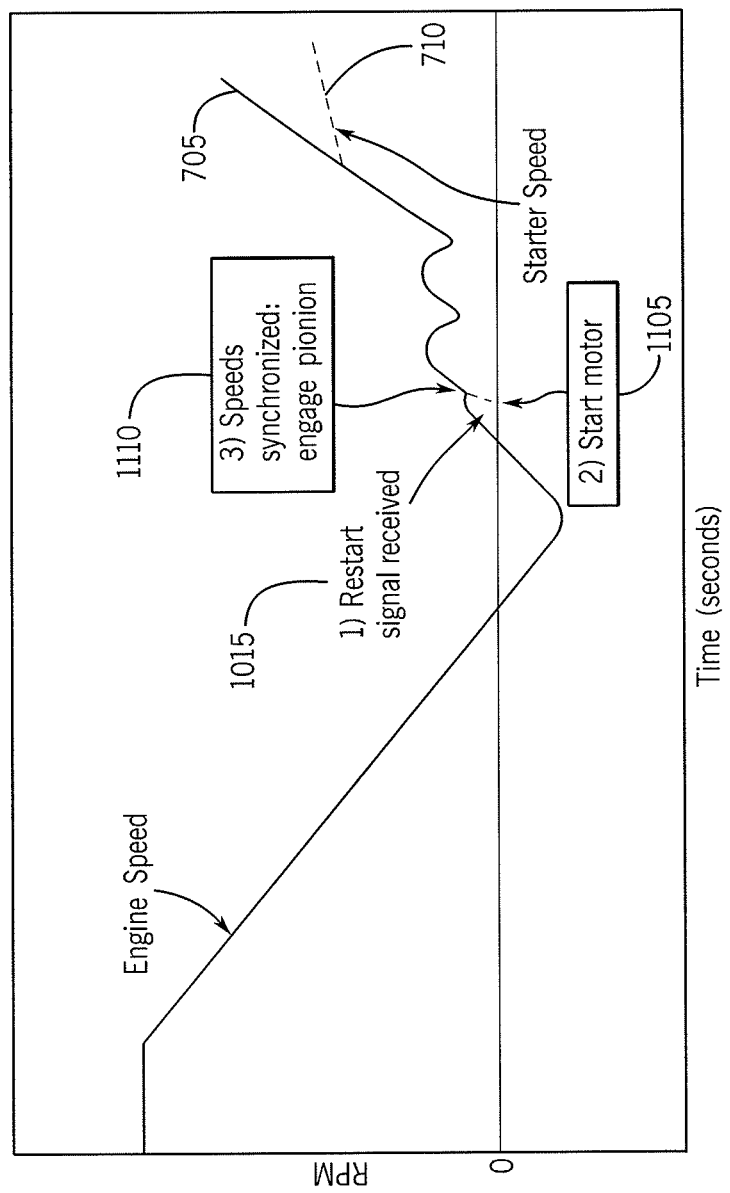
FIG. 11 is a graph representing a restart event according to one embodiment of the invention.

As shown in FIG. 11, when the electronic control module 16 receives a restart signal 1015 and the module determines that the engine speed value is within the third zone 1010, the module can initially activate the motor 170 (e.g., via energizing the second magnetic switch 355 and the secondary solenoid assembly 137). Moreover, in some embodiments, the electronic control module 16 can monitor the speeds of the pinion 150 and the ring gear 36 via the pinion speed sensor 18c and the ring gear speed sensor 18b, respectively. Once the pinion speed and the ring gear speed are substantially or completely synchronized, the electronic control module 16 can energize the first magnetic switch 350 and the solenoid assembly 125 to move the pinion 150 into engagement with the ring gear 36. As a result of the engagement and movement of the pinion 150, the engine 20 can start. Moreover, the electronic control module 16 can assess whether the engine 20 successfully started, and if the engine speed begins to increase (e.g., the engine 20 successfully started), normal operations of the vehicle can continue. For example, the pinion 150 can disengage from the ring gear 36 and the electronic control module 16 can inactivate the solenoid assembly 125 and the secondary solenoid assembly 137. If the engine speed continues to decrease (e.g., the restart event failed), the electronic control module 16 can either attempt the same restart operations detailed above or, if the engine speed continues in the oscillation zone range, the electronic control unit can proceed to make further attempts to restart the engine 20, as detailed below.

Figure 12:
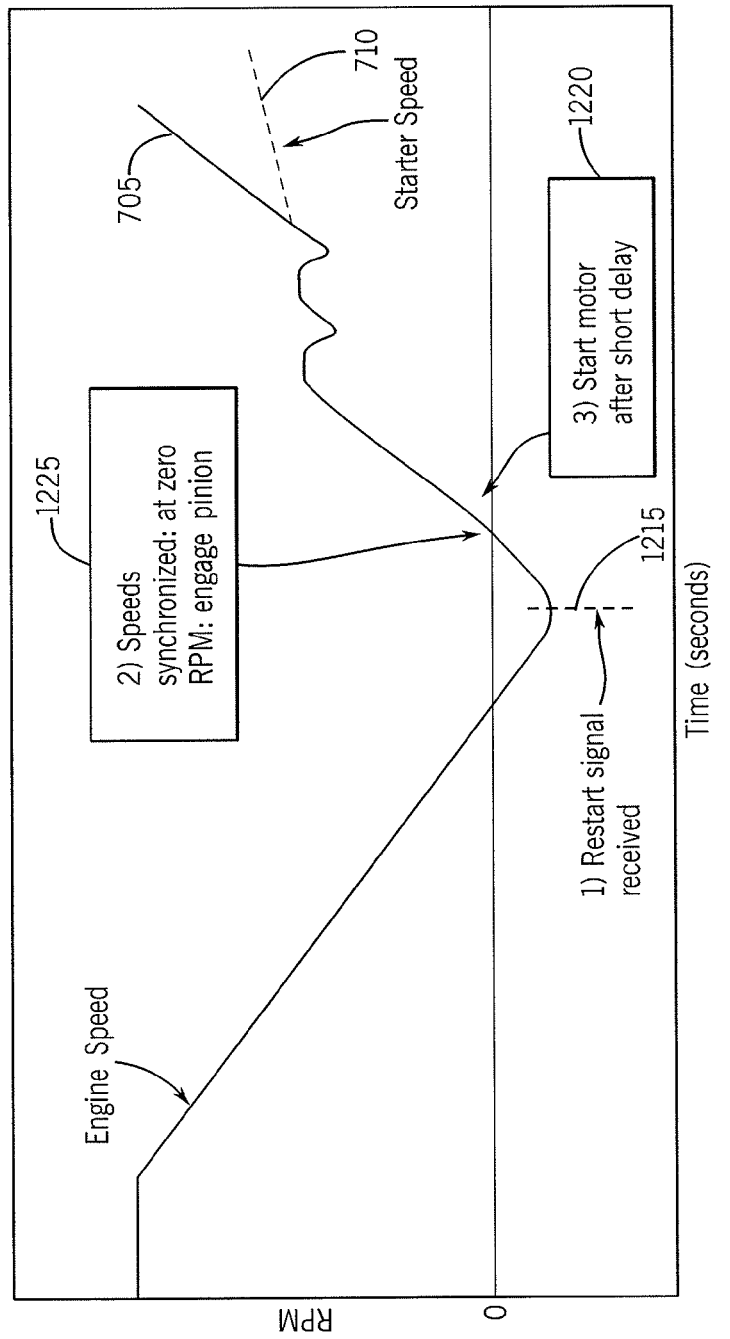
FIG. 12 is a graph representing a restart event according to one embodiment of the invention.

In some embodiments, the starter control system 10 can restart the engine 20 when the electronic control module 16 receives a restart signal 1215 and the engine speed is at a negative speed, as shown in FIG. 12. For example, at times, the electronic control module 16 can receive a restart signal 1215 from the user when the engine 20 is in the oscillation zone 725 and the crankshaft and/or ring gear 36 are moving in a negative direction. In some embodiments, if the electronic control module 16 receives a restart instruction when the engine speed is in a generally negative range, the control module 16 can delay starting the engine 20. As shown in FIG. 11, after receiving the restart signal and determining that the engine speed is negative, the electronic control module 16 can monitor the engine speed so that the speeds of the pinion 150 and ring gear 36 are substantially or completely synchronized during engagement 1225. For example, in some embodiments, when a negative speed is detected during a restart event 1215, the electronic control module 16 can delay the engagement of the pinion 150 with the ring gear 36 until the speeds of these two elements are substantially zero RPM (e.g., these two speeds are substantially or completely-synchronized) 1225. Similar to some previous embodiments, when the two speeds are substantially or completely synchronized, the electronic control module 16 can energize the first magnetic switch 350 to activate the solenoid assembly 125 to move the pinion 150 into engagement with the ring gear 36. After engagement, the electronic control module 16 can immediately energize the second magnetic switch 355 to activate the secondary solenoid assembly 137 and the motor 170. In other embodiments, the electronic control module 16 can delay energizing the second magnetic switch 355 for a predetermined period to ensure proper engagement between the pinion 150 and the ring gear 36. As a result of motor 170 activation, the pinion 150 can begin moving to start the engine 20. In some embodiments, for example, when a sensor (e.g., the ring gear 36 sensor, pinion speed sensor 18c, or any other sensor in communication with the electronic control module 16) detects a negative speed during a restart event, the electronic control module 16 can delay the engagement of the pinion 150 with the ring gear 36 until the speed of the ring gear 36 becomes positive. Accordingly, once the ring gear 36 comprises a positive speed, the electronic control module 16 can perform a restart as previously mentioned with respect to the third zone 1010.

Figure 13:
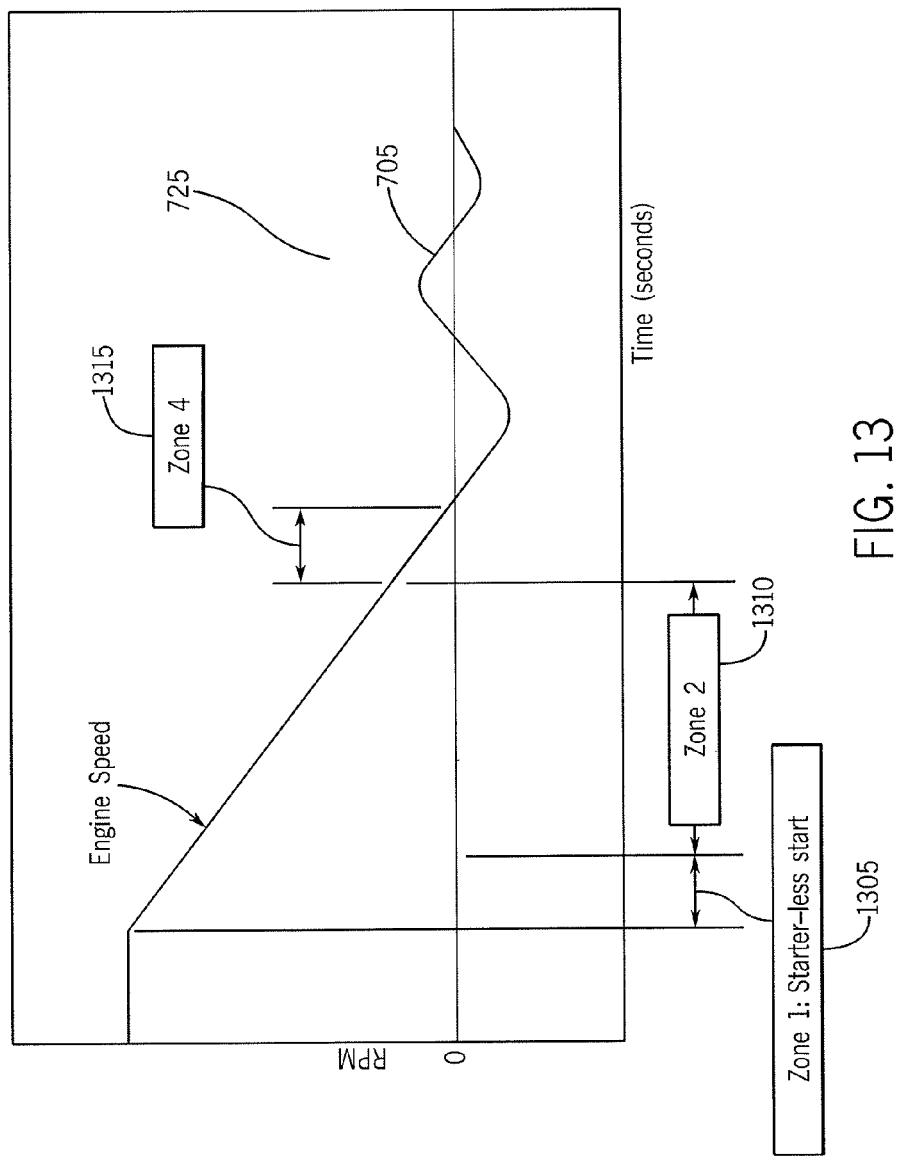
FIG. 13 is a graph representing a restart event according to one embodiment of the invention.

In some embodiments, the engine speed range can comprise a fourth zone. As shown in FIG. 13, in some embodiments, a portion of the second zone 1310 can comprise the fourth zone 1315. In some embodiments, portions of the second 1310 and third zones 1010 can comprise fourth zones 1315. For example, as the speed of the engine 20 nears zero RPM, the starter control system 10 may be mechanically limited in that the system 10 cannot substantially or completely synchronize the speed of the pinion 150 (e.g., via the second magnetic switch 355 and the secondary solenoid assembly 137) to the lessening speed of the engine 20. In some embodiments, in order to substantially or completely synchronize the speed of the ring gear 36 and the speed of the pinion 150, when it receives a restart signal within the fourth zone 1315, the electronic control module 16 can delay restarting until one of a predetermined set of events. For example, in some embodiments, the electronic control module 16 can delay the starting event until the engine speed will comprise a value at or near zero RPM or until the engine speed reaches one of the third zones 1010. In either of these cases, the electronic control module 16 can operate as previously mentioned with respect to the third zones 1010 or when the engine speed is at or near zero RPM.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the invention.

The invention claimed is:

1. A starter system comprising:
    a starter configured and arranged to be controlled by an electronic control unit, the starter further comprising:
    a motor coupled to a circuit;
    a primary plunger moveably coupled to a pinion;
    a first solenoid assembly comprising a plunger-return biasing member and at least two solenoid windings including a first set of solenoid windings and a second set of solenoid windings;

the at least two solenoid windings at least partially circumscribing the primary plunger and configured and arranged to electromagnetically couple with and move the primary plunger to a position and to substantially retain the primary plunger in a position;

a secondary solenoid assembly comprising a third set of solenoid windings at least partially circumscribing a secondary plunger, the secondary plunger being configured and arranged to electrically couple with a set of secondary solenoid assembly contacts; and at least two power isolation switches configured and arranged to be controlled by the electronic control unit, the at least two power isolation switches comprising a first switch configured and arranged to enable current to flow through the first set of solenoid windings and a second switch configured and arranged to be operated independently from the first switch to enable current to flow through the second set of solenoid windings and the third set of solenoid windings; and wherein current can flow through the second set of solenoid windings and the third set of solenoid windings irrespective of the position of the primary plunger.

2. The starter system of claim 1, wherein the resistance of the second set of solenoid windings is greater than the resistance of the first set of solenoid windings.

3. The starter system of claim 2, wherein a coupling of the secondary plunger and the set of secondary solenoid assembly contacts enables at least a portion of the circuit to enable current to flow to the motor.

4. The starter system of claim 2, wherein the secondary solenoid assembly is configured and arranged to be in communication with the electronic control unit.

5. The starter system of claim 1, wherein the first solenoid assembly is configured and arranged to be in communication with the electronic control unit.

6. The starter system of claim 1, wherein the circuit further comprises at least one pin coupled to the circuit, the at least one pin configured and arranged to receive a signal from the electronic control unit.

7. The starter of control system of claim 6, wherein the at least one pin is coupled to the motor.

8. The starter control system of claim 1, wherein the at least two power isolation switches comprise magnetic switches.

9. The starter system of claim 6, wherein the at least one pin comprises a first pin and a second pin, wherein the first pin is coupled to the first solenoid assembly and the second pin is coupled to the secondary solenoid assembly.

10. The starter system of claim 9, wherein the first pin and the second pin are configured and arranged so that the flow of current through the first pin is independent of the flow of current through the second pin and the flow of current through the second pin is independent of the flow of current through the first pin.

11. The starter system of claim 1, wherein the first set of solenoid windings is configured and arranged to move the primary plunger to a position and the second set of solenoid windings is configured and arranged to substantially retain the primary plunger in the position.

12. The starter system of claim 11, wherein the second set of solenoid windings is further configured and arranged to move the primary plunger to the position.

13. A starter system comprising:
a starter configured and arranged to be controlled by an electronic control unit, the starter further comprising:
a motor coupled to a circuit;
a primary plunger configured and arranged to be controlled by the electronic control unit and moveably coupled to a pinion;
wherein, in response to a signal from the electronic control unit, the primary plunger can be actuated to engage the pinion with a ring gear while the ring gear is coasting;
a first solenoid assembly comprising a plunger-return biasing member and at least two solenoid windings including a first set of solenoid windings and a second set of solenoid windings;
the at least two solenoid windings at least partially circumscribing the primary plunger and configured and arranged to electromagnetically couple with and move the primary plunger to a position and to substantially retain the primary plunger in a position;
a secondary solenoid assembly comprising a third set of solenoid windings at least partially circumscribing a secondary plunger, the secondary plunger being configured and arranged to electrically couple with a set of secondary solenoid assembly contacts; and
wherein the electronic control unit is configured and arranged to enable current to flow through the second set of solenoid windings and the third set of solenoid; and
wherein the electronic control unit is further configured and arranged to enable current to flow to the first set of solenoid windings independently from the current flow through the second set of solenoid windings and the third set of solenoid windings
wherein the current flowing through the second set of solenoid windings and the third set of solenoid windings can occur irrespective of the position of the primary plunger.

14. The starter system of claim 13, wherein the third set of solenoid windings is configured and arranged to move the secondary plunger to couple with the set of secondary solenoid assembly contacts causing at least a portion of a current to flow to the motor.

15. The starter system of claim 13, wherein the first set of solenoid windings is configured to move the primary plunger to the position and the second set of solenoid windings is configured to substantially retain the primary plunger in the position.

16. The starter system of claim 13, further comprising
at least two power isolation switches configured and arranged to be controlled by the electronic control unit, the at least two power isolation switches comprising a first switch configured and arranged to enable current to flow through the first set of solenoid windings and a second switch configured and arranged to be operated independently from the first switch to enable current to flow through the second set of solenoid windings and the third set of solenoid windings; and
wherein current can flow through the second set of solenoid windings and the third set of solenoid windings irrespective of the position of the primary plunger.

17. The starter system of claim 16, wherein the electronic control unit is configured and arranged to substantially simultaneously activate the second power isolation switch to enable current flow through the second set of solenoid windings and the third set of solenoid windings and deactivate the first power isolation switch to disable current flow through the first set of solenoid windings.

18. The starter system of claim 17, wherein the electronic control unit is configured and arranged to activate the second power isolation switch to enable current flow through the second set of solenoid windings and the third set of solenoid windings before the deactivating the first power isolation switch to disable current flow through the first set of solenoid windings.

19. The starter system of claim 16, wherein the electronic control unit is configured and arranged to deenergize the first power isolation switch to disable current flow through the first set of solenoid windings before deenergizing the second power isolation switch to disable current flow through the second set of solenoid windings and the third set of solenoid windings.

20. The starter system of claim 13, wherein the electronic control unit is configured and arranged to enable current to flow in parallel through the second set of solenoid windings and the third set of solenoid windings.

* * * * *